(12) United States Patent
Jalilian et al.

(10) Patent No.: US 10,859,212 B2
(45) Date of Patent: Dec. 8, 2020

(54) METHOD AND SYSTEM FOR DETECTING WHETHER AN ACOUSTIC EVENT HAS OCCURRED ALONG A FLUID CONDUIT

(71) Applicant: Hifi Engineering Inc., Calgary (CA)

(72) Inventors: Seyed Ehsan Jalilian, Calgary (CA); Arne Dankers, Calgary (CA); David Westwick, Calgary (CA)

(73) Assignee: Hifi Engineering Inc., Alberta (CA)

( * ) Notice: Subject to any disclaimer, the term of this patent is extended or adjusted under 35 U.S.C. 154(b) by 258 days.

(21) Appl. No.: 16/024,513

(22) Filed: Jun. 29, 2018

(65) Prior Publication Data

US 2019/0137045 A1    May 9, 2019

(30) Foreign Application Priority Data

Jun. 30, 2017    (CA) ..................... 2972380

(51) Int. Cl.
*F17D 5/06* (2006.01)
*G01M 3/24* (2006.01)
*G01M 3/38* (2006.01)
*E21B 47/26* (2012.01)
*E21B 47/107* (2012.01)
(Continued)

(52) U.S. Cl.
CPC .............. *F17D 5/06* (2013.01); *E21B 47/107* (2020.05); *E21B 47/26* (2020.05); *G01H 9/004* (2013.01); *G01M 3/243* (2013.01); *G01M 3/38* (2013.01); *G01N 29/14* (2013.01)

(58) Field of Classification Search
CPC ............. G01M 3/38; G01N 29/14; F17D 5/06
See application file for complete search history.

(56) References Cited

U.S. PATENT DOCUMENTS

2019/0195663 A1*  6/2019  Leblanc ................. E21B 49/08

FOREIGN PATENT DOCUMENTS

WO    WO2013/102252    7/2013

OTHER PUBLICATIONS

R. Aichner, H. Buchner, F. Yan, and W. Kellermann, "A real-time blind source separation scheme and its application to reverberant and noisy acoustic environments," *Signal Processing*, vol. 86, No. 6, pp. 1260-1277, Oct. 21, 2005.

(Continued)

*Primary Examiner* — Sung H Pak
*Assistant Examiner* — Hoang Q Tran
(74) *Attorney, Agent, or Firm* — Klarquist Sparkman, LLP

(57) ABSTRACT

Methods, systems, and techniques for determining whether an acoustic event has occurred along a fluid conduit having acoustic sensors positioned therealong. The method uses a processor to, for each of the sensors, determine a predicted acoustic signal using one or more past acoustic signals measured prior to measuring a measured acoustic signal using the sensor; determine a prediction error between the measured acoustic signal and the predicted acoustic signal; from the prediction error, determine a power estimate of an acoustic source located along a longitudinal segment of the fluid conduit overlapping the sensor; and determine whether the power estimate of the acoustic source exceeds an event threshold for the sensor. When the power estimate of at least one of the acoustic sources exceeds the event threshold, the processor attributes the acoustic event to one of the sensors for which the power estimate of the acoustic source exceeds the event threshold.

20 Claims, 13 Drawing Sheets

(51) Int. Cl.
*G01H 9/00* (2006.01)
*G01N 29/14* (2006.01)

(56) References Cited

OTHER PUBLICATIONS

R. Aichner, H. Buchner, and W. Kellermann, "Convolutive blind source separation for noisy mixtures," in *Speech and Audio Processing in Adverse Environments*, ser. Signals and Communication Technology, E. Hansler and G. Schmidt, Eds. Springer Berlin Heidelberg, 2008, ch. 13, pp. 469-525.

M. Brennan, Y. Gao, and P. Joseph, "On the relationship between time and frequency domain methods in time delay estimation for leak detection in water distribution pipes," *Journal of Sound and Vibration*, vol. 304, No. 12, pp. 213-223, 2007.

H. Buchner, R. Aichner, and W. Kellermann, "A generalization of blind source separation algorithms for convolutive mixtures based on second-order statistics," *IEEE Transactions on Speech and Audio Processing*, vol. 13, No. 1, pp. 120-134, Jan. 2005.

H. Buchner, R. Aichner and W. Kellermann, "Trinicon-based Blind System Identification with Application to Multiple-Source Localization and Separation," *Blind Speech Separation*, pp. 101-147, 2007.

H. Fuchs and R. Riehle, "Ten years of experience with leak detection by acoustic signal analysis," *Applied Acoustics*, vol. 33, pp. 1-19, 1991.

Y. Gao, M. Brennan, and P. Joseph, "On the effects of reflections on time delay estimation for leak detection in buried plastic water pipes," *Journal of Sound and Vibration*, vol. 325, No. 3, pp. 649-663, May 8, 2009.

Y. Hua, S. An, and Y. Xiang, "Blind identification of FIR MIMO channels by decorrelating subchannels," *IEEE Transactions on Signal Processing*, vol. 51, No. 5, pp. 1143-1155, May 2003.

Y. Huang, J. Benesty, and J. Chen, "Identification of MIMO systems: Challenges and opportunities," *Signal Processing*, vol. 86, No. 6, pp. 1278-1295, Oct. 19, 2005.

Y. Huang, J. Benesty, and J. Chen, "Simulation, Prediction, & Control," *Acoustic MIMO Signal Processing*, ser. Signals and Communication Technology, Springer-Verlag Berlin Heidelberg, ch. 3, pp. 51-68, 2006.

L. Ljung, "Blind Identification of Acoustic MIMO Systems," *System Identification. Theory for the User*, ch. 6, 2nd ed. Prentice Hall, pp. 109-167, 1999.

L. Meng, L. Yuxing, W. Wuchang, and F. Juntao, "Experimental study on leak detection and location for gas pipeline based on acoustic method," *Journal of Loss Prevention in the Process Industries*, vol. 25, pp. 90-102, 2012.

R. Pintelon and J. Schoukens, "Design of Excitation Signals," *System Identification, A Frequency Domain Approach*, 2nd ed., ch. 5, pp. 151-175, Hoboken, New Jersey, USA: IEEE Press, John Wiley and Sons, Inc., 2012.

X. Qingqing, Z. Laibin, and L. Wei, "Acoustic detection technology for gas pipeline leakage," *Process Safety and Environmental Protection*, vol. 91, pp. 253-261, 2013.

L. Wei, Z. Laibin, X. Qingqing, and Y. Chunying, "Gas pipeline leakage detection based on acoustic technology," *Engineering Failure Analysis*, vol. 31, pp. 1-7, Nov. 16, 2012.

E. Weinstein, M. Feder, and A. Oppenheim, "Multi-channel signal separation by decorrelation," *IEEE Transactions on Speech and Audio Processing*, vol. 1, No. 4, pp. 405-413, Oct. 1993.

J. Yang, Y. Wen, and P. Li, "Leak location using blind system identification in water distribution pipelines," *Journal of Sound and Vibration*, vol. 310, pp. 134-148, Nov. 1, 2007.

\* cited by examiner

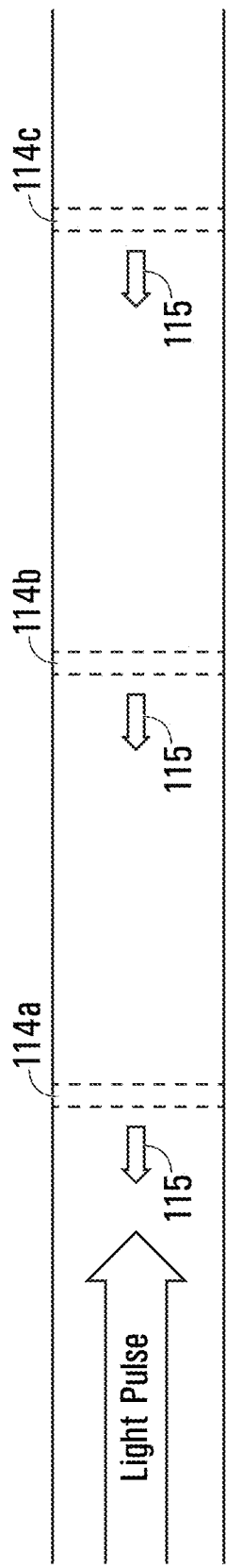
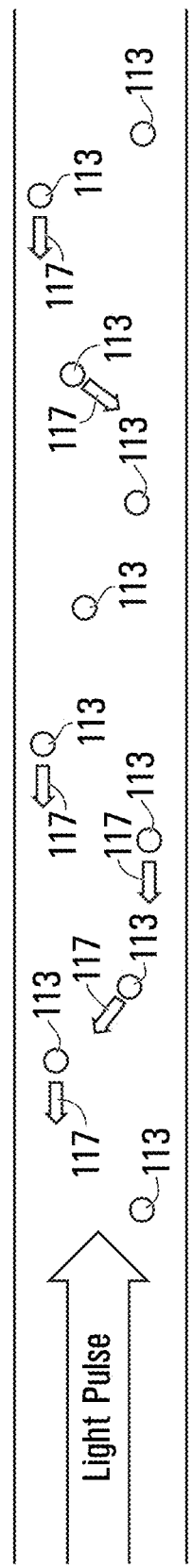
FIG. 1B
FIG. 1C

METHOD AND SYSTEM FOR DETECTING WHETHER AN ACOUSTIC EVENT HAS OCCURRED ALONG A FLUID CONDUIT

CROSS REFERENCE TO RELATED APPLICATION

This application claims priority to Canadian Patent Application No. CA 2,972,380, filed Jun. 30, 2017. The Canadian application is incorporated herein in its entirety.

TECHNICAL FIELD

The present disclosure is directed at methods, systems, and techniques for detecting whether an acoustic event has occurred along a fluid conduit such as a pipeline, well casing, or production tubing.

BACKGROUND

Pipelines and oil and gas wells are examples of conduits that are used to transport liquids or gases (collectively, "fluids") which, if leaked, could cause environmental damage. In the example of pipelines, the fluid may comprise oil. In the example of an oil well, the fluid may comprise liquid production fluid or be gaseous, such as when casing vent flow or gas migration occurs. Accordingly, in certain circumstances it may be desirable to monitor fluid conduits to determine whether a leak or other event potentially relevant to the integrity of the conduit has occurred.

SUMMARY

According to a first aspect, there is provided a method for determining whether an acoustic event has occurred along a fluid conduit having acoustic sensors positioned therealong. The method comprises using a processor to, for each of the sensors, determine a predicted acoustic signal using one or more past acoustic signals measured prior to measuring a measured acoustic signal using the sensor; after the measured acoustic signal has been measured, determine a prediction error between the measured acoustic signal and the predicted acoustic signal; from the prediction error, determine a power estimate of an acoustic source located along a longitudinal segment of the fluid conduit overlapping the sensor; and determine whether the power estimate of the acoustic source exceeds an event threshold for the sensor. When the power estimate of at least one of the acoustic sources exceeds the event threshold, the acoustic event is attributed to one of the sensors for which the power estimate of the acoustic source exceeds the event threshold.

The processor may attribute the acoustic event to the one of the sensors for which the power estimate of the acoustic source most exceeds the event threshold.

The acoustic event may comprise one of multiple acoustic events, and the processor may attribute one of the acoustic events to each of the sensors for which the power estimate of the acoustic source exceeds the event threshold.

The event threshold may represent a deviation from a baseline measurement and the acoustic event may be attributed to the sensor having the greatest deviation from the baseline measurement.

The processor may determine the predicted acoustic signal from the one or more past acoustic signals by applying a linear regression.

The processor may apply the linear regression by multiplying a regression matrix and a parameter vector, and the parameter vector may be parameterized using a Finite Impulse Response model structure.

The method may further comprise selecting the parameter vector such that the parameter vector is sufficiently near a minimum prediction error to satisfy a stopping criterion The parameter vector may be selected to minimize the prediction error.

The processor may perform a QR factorization to minimize the prediction error.

The method may further comprise, for each of the sensors and prior to identifying the acoustic event as having occurred, using the processor to determine a cross-correlation between the prediction error and the one or more past acoustic signals; compare the cross-correlation to a cross-correlation threshold; and confirm the cross-correlation satisfies the cross-correlation threshold.

The method may further comprise, for each of the sensors and prior to identifying the acoustic event as having occurred, using the processor to determine an auto-correlation of the prediction error; compare the auto-correlation to an auto-correlation threshold; and confirm the prediction error is white by confirming the auto-correlation satisfies the auto-correlation threshold.

Each of the sensors may be delineated by a pair of fiber Bragg gratings located along an optical fiber and tuned to substantially identical center wavelengths, and the method may further comprise optically interrogating the optical fiber in order to obtain the measured acoustic signal.

The optical fiber may be within a fiber conduit laid adjacent the fluid conduit.

The fluid conduit may comprise a pipeline.

According to another aspect, there is provided a method for determining whether an acoustic event has occurred along a fluid conduit having acoustic sensors positioned therealong. The method comprises determining, using a processor and for each of the sensors, a predicted acoustic signal using one or more past acoustic signals measured prior to measuring a measured acoustic signal using the sensor; after the measured acoustic signal has been measured, a prediction error between the measured acoustic signal and the predicted acoustic signal; a linear relationship between a measured acoustic signal measured using the sensor and a white noise acoustic source located along a longitudinal segment of the fluid conduit overlapping the sensor, wherein each element of the linear relationship comprises a parameterized transfer function selected such that the prediction error is sufficiently small to satisfy a stopping criterion; and from the linear relationship, an acoustic path response and an acoustic source transfer function that transforms the white noise acoustic source. The method further comprises monitoring over time variations in one or both of the acoustic path responses and acoustic source transfer functions; determining whether at least one of the variations exceeds an event threshold; and when at least one of the variations exceeds the event threshold, attributing the acoustic event to one of the sensors corresponding to the acoustic path response or acoustic source transfer function that varied in excess of the event threshold.

The processor may attribute the acoustic event to the one of the sensors for which the variation most exceeds the event threshold.

The acoustic event may comprise one of multiple acoustic events, and the processor may attribute one of the acoustic events to each of the sensors for which the variation exceeds the event threshold.

The acoustic path response may comprise an acoustic response of the longitudinal segment and the acoustic event may be identified as having occurred along the longitudinal segment corresponding to the sensor to which the acoustic event originated is attributed For each of the channels, the processor may determines the linear relationship between the measured acoustic signal, the white noise acoustic source located along the longitudinal segment, and white noise acoustic sources located along any immediately adjacent longitudinal segments.

Each element of the linear relationship may be parameterized using a finite impulse response structure.

The processor may determine the acoustic path responses and acoustic source transfer functions by factoring the linear relationship using a linear regression, wherein the linear regression is factored into a first array of parameterized transfer functions for determining the acoustic path responses and a second array of parameterized transfer functions for determining the acoustic source transfer functions.

Each of the first and second arrays may be parameterized using a finite impulse response structure.

The method may further comprise, prior to monitoring variations in one or both of the acoustic path responses and acoustic source transfer functions, refining the one or both of the acoustic path responses and acoustic source transfer functions using weighted nullspace least squares.

The method may further comprise determining a confidence bound for each of two of the acoustic path responses or two of the acoustic source transfer functions; from the confidence bounds, determining a statistical distance between the two of the acoustic source responses or the two of the acoustic source transfer functions; comparing the statistic distance to the event threshold; and identifying the acoustic event as having occurred when the statistical distance exceeds the event threshold.

The method may further comprise dividing the measured acoustic signal into blocks of a certain duration prior to determining the linear relationship.

Each of the longitudinal segments may be delineated by a pair of fiber Bragg gratings located along an optical fiber and tuned to substantially identical center wavelengths, and the method may further comprise optically interrogating the optical fiber in order to obtain the measured acoustic signal.

The optical fiber may be within a fiber conduit laid adjacent the fluid conduit.

The fluid conduit may comprise a pipeline.

According to a first aspect, there is provided a method for determining whether an acoustic event has occurred along a fluid conduit having acoustic sensors positioned therealong. The method comprises determining, using a processor and for each of the sensors, a linear relationship between a measured acoustic signal measured using the sensor and a white noise acoustic source located along a longitudinal segment of the fluid conduit overlapping the sensor; and from the linear relationship, an acoustic path response and an acoustic source transfer function that transforms the white noise acoustic source. The method further comprises monitoring over time variations in one or both of the acoustic path responses and acoustic source transfer functions; determining whether at least one of the variations exceeds an event threshold; and when at least one of the variations exceeds the event threshold, attributing the acoustic event to one of the sensors corresponding to the acoustic path response or acoustic source transfer function that varied in excess of the event threshold.

The processor may attribute the acoustic event to the one of the sensors for which the variation most exceeds the event threshold.

The acoustic event may comprise one of multiple acoustic events, and wherein the processor attributes one of the acoustic events to each of the sensors for which the variation exceeds the event threshold.

The acoustic path response may comprise an acoustic response of the longitudinal segment and the acoustic event may be identified as having occurred along the longitudinal segment corresponding to the sensor to which the acoustic event is attributed.

For each of the channels, the processor may determine the linear relationship between the measured acoustic signal, the white noise acoustic source located along the longitudinal segment, and white noise acoustic sources located along any immediately adjacent longitudinal segments.

Each element of the linear relationship may be a parameterized transfer function that is parameterized using a finite impulse response structure.

The processor may determine the acoustic path responses and acoustic source transfer functions by factoring the linear relationship using a linear regression, wherein the linear regression may be factored into a first array of parameterized transfer functions for determining the acoustic path responses and a second array of parameterized transfer functions for determining the acoustic source transfer functions.

Each of the first and second arrays may be parameterized using a finite impulse response structure.

The method may further comprise, prior to monitoring variations in one or both of the acoustic path responses and acoustic source transfer functions, refining the one or both of the acoustic path responses and acoustic source transfer functions using weighted nullspace least squares.

The method may comprise determining a confidence bound for each of two of the acoustic path responses or two of the acoustic source transfer functions; from the confidence bounds, determining a statistical distance between the two of the acoustic source responses or the two of the acoustic source transfer functions; comparing the statistical distance to the event threshold; and identifying the acoustic event as having occurred when the statistical distance exceeds the event threshold.

The method may further comprising dividing the measured acoustic signal into blocks of a certain duration prior to determining the linear relationship.

Each of the longitudinal segments may be delineated by a pair of fiber Bragg gratings located along an optical fiber and tuned to substantially identical center wavelengths, and the method may further comprise optically interrogating the optical fiber in order to obtain the measured acoustic signal.

The optical fiber may extend parallel to the fluid conduit.

The optical fiber may be wrapped around the fluid conduit.

The optical fiber may be within a fiber conduit laid adjacent the fluid conduit.

The fluid conduit may comprise a pipeline.

According to another aspect, there is provided a system for detecting whether an acoustic event has occurred along a fluid conduit longitudinally divided into measurements channels. The system comprises an optical fiber extending along the conduit and comprising fiber Bragg gratings (FBGs), wherein each of the measurement channels is delineated by a pair of the FBGs tuned to substantially identical center wavelengths; an optical interrogator optically coupled to the optical fiber and configured to optically interrogate the FBGs and to output an electrical measured acoustic signal; and a signal processing unit. The signal processing unit comprises a processor communicatively coupled to the optical interrogator; and a non-transitory computer readable medium communicatively coupled to the processor, wherein the medium has computer program code stored thereon that is executable by the processor and that, when executed by the processor, causes the processor to perform the method of any of the foregoing aspects or suitable combinations thereof.

The optical fiber may extends parallel to the fluid conduit.

The optical fiber may be wrapped around the fluid conduit.

The system may further comprise a fiber conduit adjacent the fluid conduit, wherein the optical fiber extends within the fiber conduit.

The fluid conduit may comprise a pipeline.

According to another aspect, there is provided a non-transitory computer readable medium having stored thereon computer program code that is executable by a processor and that, when executed by the processor, causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 1B is a schematic that depicts how the FBGs reflect a light pulse.

FIG. 1C is a schematic that depicts how a light pulse interacts with impurities in an optical fiber that results in scattered laser light due to Rayleigh scattering, which is used for distributed acoustic sensing ("DAS").

DETAILED DESCRIPTION

As used herein, "acoustics" refer generally to any type of "dynamic strain" (strain that changes over time). Acoustics having a frequency between about 20 Hz and about 20 kHz are generally perceptible by humans. Acoustics having a frequency of between about 5 Hz and about 20 Hz are referred to by persons skilled in the art as "vibration", and acoustics that change at a rate of <1 Hz, such as at 500 µHz, are referred to as "sub-Hz strain"; as used herein, a reference to "about" or "approximately" a number or to being "substantially" equal to a number means being within +/− 10% of that number.

When using acoustics to determine whether an event, such as a pipeline leak, has occurred, it may be desirable to distinguish between different types of events that generate different sounds, where "different" refers to a difference in one or both of acoustic intensity and frequency. For example, when the equipment being monitored is a buried oil pipeline, it may be any one or more of a leak in that pipeline, a truck driving on the land over that pipeline, and a pump operating near the pipeline that are generating a sound. However, of the three events, it may only be the leak that requires immediate attention. Similarly, when monitoring a well, it may be one or both of pumping equipment and an instance of casing vent flow that generate a sound. Again, while the casing vent flow may require remediation, the standard operation of pumping equipment does not.

Figure 1A:
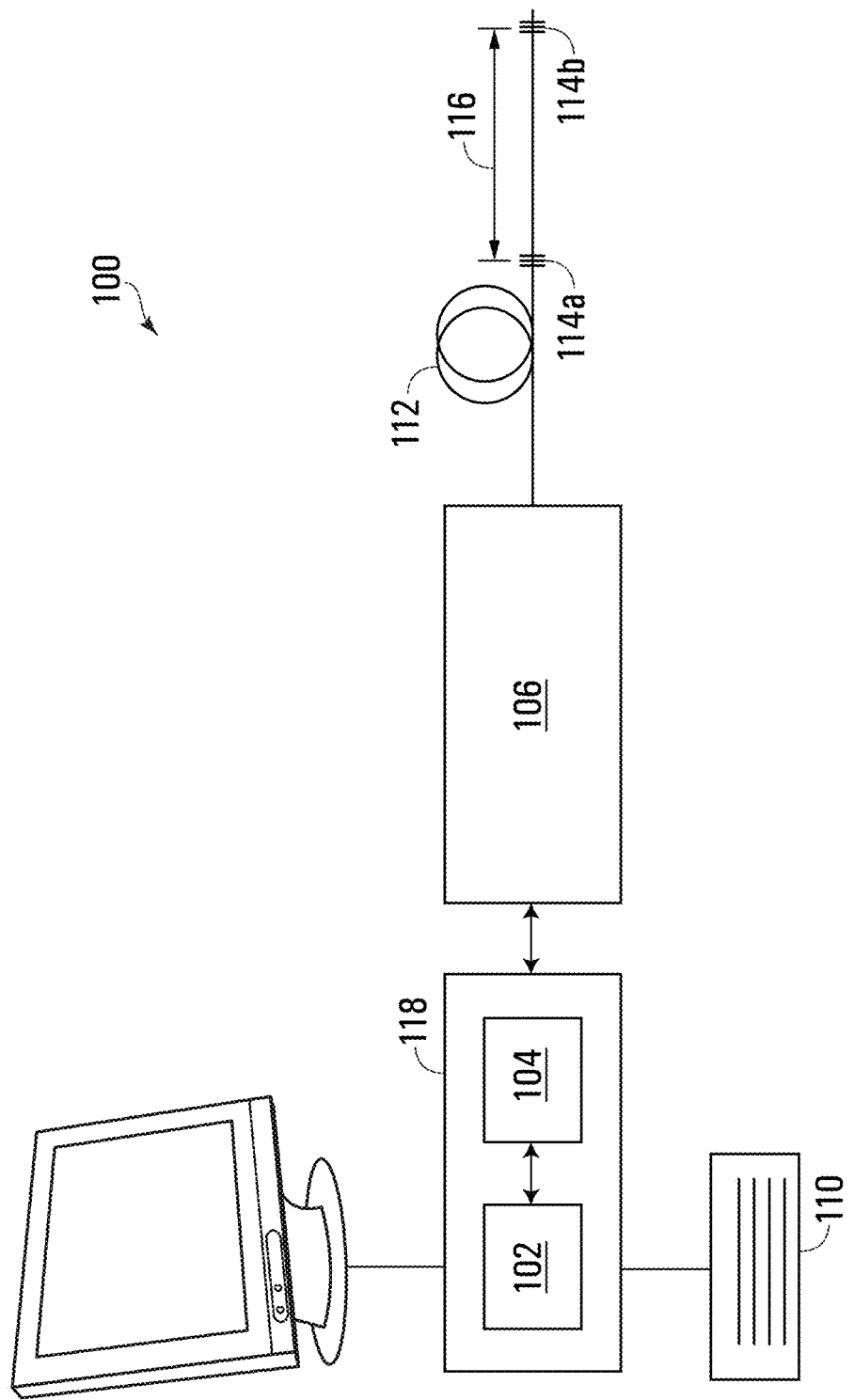
FIG. 1A is a block diagram of a system for determining whether an acoustic event has occurred along a fluid conduit, which includes an optical fiber with fiber Bragg gratings ("FBGs") for reflecting a light pulse, according to one example embodiment.

The embodiments described herein are directed at methods, systems, and techniques for detecting whether an acoustic event has occurred along a fluid conduit such as a pipeline. Optical interferometry using fiber Bragg gratings ("FBGs"), as described in further detail with respect to FIGS. 1A-1C, is used to measure acoustics. In some of the embodiments described herein, a processor determines a measured acoustic signal using optical interferometry and from that measured acoustic signal determines whether a particular event, such as a pipeline leak, has occurred.

Referring now to FIG. 1A, there is shown one embodiment of a system 100 for fiber optic sensing using optical fiber interferometry. The system 100 comprises an optical fiber 112, an interrogator 106 optically coupled to the optical fiber 112, and a signal processing device (controller) 118 that is communicative with the interrogator 106. While not shown in FIG. 1A, within the interrogator 106 are an optical source, optical receiver, and an optical circulator. The optical circulator directs light pulses from the optical source to the optical fiber 112 and directs light pulses received by the interrogator 106 from the optical fiber 112 to the optical receiver.

The optical fiber 112 comprises one or more fiber optic strands, each of which is made from quartz glass (amorphous $SiO_2$). The fiber optic strands are doped with a rare earth compound (such as germanium, praseodymium, or erbium oxides) to alter their refractive indices, although in different embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SFM28e fibers, and Infini-Cor® series multimode fibers.

The interrogator 106 generates sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a fiber optic sensor 116 that comprises a segment of fiber extending between the first and second FBGs 114a,b. The length of the sensor 116 varies in response to an event (such as an acoustic event) that the optical fiber 112 experiences. Each fiber segment between any pair of adjacent FBGs 114 with substantially identical center wavelengths is referred to as a "sensor" 116 of the system 200. The system 200 accordingly comprises multiple sensors 116, each of which is a distributed sensor 116 that spans the length of the segment between the adjacent FBGs 114. An example sensor length is 25 m. In the depicted embodiment, the FBGs 114 are consistently separated by, and the sensors 116 accordingly each have a length of, 25 m; however, in different embodiments (not depicted) any one or more of the sensors 116 may be of different lengths.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in different embodiments (not depicted) any number of FBGs 114 may be on the fiber 112, and time division multiplexing ("TDM") (and optionally, wavelength division multiplexing ("WDM")) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the optical source 101. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, and the optical receiver 103 records the resulting interference signal. The event that the sensor 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the event the sensor 116 is experiencing, which allows the interrogator 106 to estimate the magnitude of the event the sensor 116 experiences from the received optical power. The interrogator 106 digitizes the phase difference and outputs an electrical signal ("output signal") whose magnitude and frequency vary directly with the magnitude and frequency of the event the sensor 116 experiences.

The signal processing device (controller) 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has encoded on it computer program code to cause the processor 102 to perform any suitable signal processing methods to the output signal. For example, if the sensor 116 is laid adjacent a region of interest that is simultaneously experiencing acoustics from two different sources, one at a rate under 20 Hz and one at a rate over 20 Hz, the sensor 116 will experience similar strain and the output signal will comprise a superposition of signals representative of those two sources. The processor 102 may apply a low pass filter with a cutoff frequency of 20 Hz to the output signal to isolate the lower frequency portion of the output signal from the higher frequency portion of the output signal. Analogously, to isolate the higher frequency portion of the output signal from the lower frequency portion, the processor 102 may apply a high pass filter with a cutoff frequency of 20 Hz. The processor 102 may also apply more complex signal processing methods to the output signal; example methods include those described in PCT application PCT/CA2012/000018 (publication number WO 2013/102252), the entirety of which is hereby incorporated by reference.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect an event along the fiber 112 occurring further from the optical source 101 than the second FBG 114b. For example, in the embodiment of FIG. 1B, a portion of the sensing pulse not reflected by the first and second FBGs 114a,b can reflect off the third FBG 114c and a portion of the reference pulse not reflected by the first FBG 114a can reflect off the second FBG 114b, and these reflected pulses can interfere with each other at the interrogator 106.

Any changes to the optical path length of the sensor 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the sensor 116 and that phase difference ($\theta$) is $\theta = 2\pi nL/\lambda$, where n is the index of refraction of the optical fiber; L is the optical path length of the sensor 116; and $\lambda$ is the wavelength of the optical pulses. A change in nL is caused by the fiber experiencing longitudinal strain induced by energy being transferred into the fiber. The source of this energy may be, for example, an object outside of the fiber experiencing the acoustics.

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the event experienced by the fiber during an interrogation time window, which is a proxy for the magnitude of the event, such as vibration or acoustics emanating from the region of interest. In contrast, the embodiments described herein measure events experienced by the fiber 112 using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of 2% or 5%. The use of FBG-based interferometry to measure interference causing events offers several advantages over DAS, in terms of optical performance.

FIGS. 2-10 depict embodiments of methods, systems, and techniques for determining whether an acoustic event has occurred along a fluid conduit, such as a wellbore (e.g., well casing, production tubing) or pipeline. In certain embodiments, the system 100 of FIG. 1A obtains a measured acoustic signal using the sensors 116 placed along a pipeline to estimate the acoustic response of the path along which the acoustic signal propagates (hereinafter interchangeably referred to as the "acoustic path response"), which comprises the response of the fluid conduit, and the frequency content of external signals affecting the pipeline, which are modeled as acoustic source transfer functions that transform white noise acoustic sources. Being able to distinguish between changes in the acoustic path response and changes in the frequency content of the external signals affecting the pipeline may be used in leak detection and pipeline monitoring systems.

Technical challenges when developing a leak detection system comprise:
1. enabling real-time reporting of leaks;
2. the ability to sense small leaks;
3. automatically detecting leaks irrespective of environmental and operating conditions;
4. accurately estimating leak location; and
5. avoiding false alarms, which may comprise identifying and categorizing events other than leaks.

Figure 2:
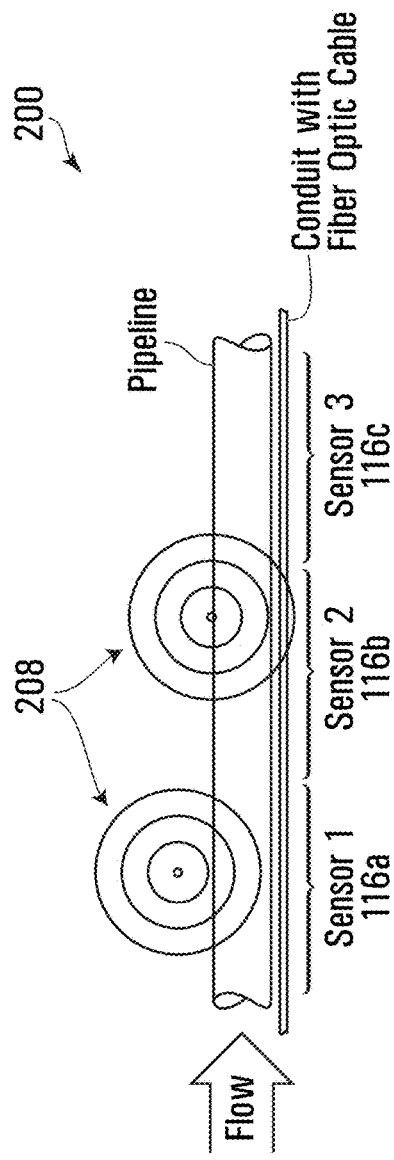
FIG. 2 depicts a pipeline laying adjacent to a fiber conduit, according to one example embodiment.

Certain embodiments described herein are able to continuously monitor pipelines using acoustic sensing equipment. FIG. 2 shows an example system 200 comprising a fluid conduit in the form of a pipeline 204 laid alongside a fiber conduit 202 within which is the optical fiber 112. A pair of acoustic events 208a,b (generally, "acoustic events 208") are depicted. The acoustic event 208b on the pipeline 204 may represent, for example, a leak. As discussed above in respect of FIGS. 1A-1C, the FBGs 114 are sensitive to acoustics of various frequencies. The FBGs 114 accordingly comprise the functionality of a microphone and accelerometer. The conduit 202 is placed on or sufficiently near the pipeline 204 so as to be able to measure acoustics generated by the acoustic events 208. In certain example embodiments, the conduit 202 contacts the pipeline 204 or is within 10 cm, 20 cm, 30 cm, 40 cm, 50 cm, 60 cm, 70 cm, 80 cm, 90 cm, 1 m, 2 m, 3 m, 4 m, or 5 m of the pipeline 204. The FBGs 114 in the depicted embodiment are etched into the fiber 112 at 25 m intervals. Three sensors 116a-c are accordingly depicted in FIG. 2, although in different embodiments (not depicted) there may be as few as two of the sensors 116 or many more than three of the sensors 116.

Each of the sensors 116a-c in the depicted embodiment overlaps with a longitudinal segment of the pipeline 204, with none of the longitudinal segments overlapping each other and all of the longitudinal segments collectively forming a continuous portion of the pipeline 204. In different embodiments (not depicted), the longitudinal segments of the pipeline 204 that are monitored may not be continuous. For example, any two or more neighbouring longitudinal segments may be spaced apart so long as the neighbouring segments remain acoustically coupled to each other. Additionally or alternatively, in different embodiments (not depicted) the fiber 112 may not extend parallel with the pipeline 204. For example, in one example the fiber 112 is wound around segments of the pipeline 204 to increase sensitivity.

The system 200 of FIG. 2 permits continuous measurements to be obtained using the FBGs 114, thus facilitating real-time reporting of leaks. As different sensors correspond to different longitudinal segments of the pipeline 204, event localization becomes easier. Also, using the conduit 202, which may be plastic, to house the optical fiber 112 permits relatively straightforward installation. As discussed in more detail below, certain embodiments described herein are able to sense relatively small leaks and leaks occurring under low pipeline pressure or slack conditions.

Many conventional event detection systems are able to detect events 208, such as leaks or flow rate changes, when they have a priori knowledge about when the event is expected to occur. A more technically challenging problem is performing event detection without that a priori information. Similarly, many conventional event detection systems are able to detect events 208 during periods of relatively constant environmental or ambient conditions. A more technically challenging problem is performing event detection when one or both of operating and environmental conditions are changing.

At least some of the embodiments described herein address these technical challenges. The processor 102 extracts leak relevant features from the measured acoustic signal. Fluid escaping from the pipeline 204 may do any one or more of:
1. emit a broadband sound (a hiss);
2. cause a vibration along the pipeline 204;
3. cause a strain on the conduit 202 (as fluid escaping the pipeline 204 hits the conduit 202);
4. decrease pressure in the pipeline 204; and
5. related to any pressure decrease, cause a decrease in mass flow rate in the pipeline 204 downstream of the leak.

Whenever a leak is present, a hole or crack in the pipeline 204 is also present. The leak itself may have different causes including any one or more of:
1. denting or buckling in the pipeline 204;
2. a faulty seal between two flanges comprising the pipeline 204 (e.g., if the flanges are not bolted sufficiently tightly together);
3. corrosion in the pipeline 204;
4. movement of the ground surrounding the pipeline 204; and
5. an intrusion attempt or accidental damage of the pipeline 204 using machinery.

The processor 102 distinguishes the aforementioned causes of the leak from normal or non-critical events affecting the pipeline 204, such as:
1. changes in fluid flow rate;
2. changes in fluid density;
3. external environmental sounds due to traffic, rivers, wind, rain, etc.;
4. changes in soil composition due to rain;
5. changes in the pipeline 204, FBGs 114, or material surrounding the pipeline 204 due to daily temperature cycles;
6. vibrations due to machinery such as pumps and compressors attached to or near the pipeline 204; and
7. sensor errors and temporary sensor failures, etc.

Described herein is an approach to estimate both the acoustic path response, which in certain embodiments comprises the pipeline's 204 frequency response, and the frequency content of acoustic sources affecting the pipeline 204. By obtaining estimates of (and monitoring) both the pipeline's 204 frequency response and the acoustic sources' frequency content the processor 102 determines at least some of the features and causes of leaks listed above. For example:
1. A dent or buckling of the pipeline 204 changes the frequency response of the longitudinal segment of the pipeline 204 comprising that dent or buckling.
2. Changing the pressure of the fluid in the pipeline 204 causes changes in both the acoustic path response and the frequency content of an acoustic source. The change in the acoustic path response does not result from a change in the response of the pipeline 204 per se, but the pressure of the fluid flowing through the pipeline 204. Thus, by monitoring for these changes the processor 102 in certain embodiments estimates the fluid pressure for each of the pipeline's 204 longitudinal segments. Once an estimate of the pressure for each of the segments is obtained, in certain embodiments the processor 102 detects leaks by monitoring for drops in pressure along downstream segments.
3. If the frequency content of an acoustic source affecting a particular longitudinal segment suddenly exhibits an increase in broadband content, this may be due to the "hiss" of a leak in that segment.

The processor 102, by being sensitive to several features of a leak, increases sensitivity to leaks and reduces the likelihood of a false positive occurring. The more features that are detected that are consistent with a leak, the more confidence associated with the processor's 102 determination that a leak is present.

The following assumptions apply to the pipeline 204 and system 200 of FIG. 2:
1. An event 208 acts as an acoustic source. Acoustic sources may also comprise, for example, environmental noise or sound emitted by a leak.
2. An acoustic source "is attributed to" one of the sensors 116 when the acoustics that that source emits are first detected by that one of the sensors 116. In an embodiment in which the pipeline 204 extends substantially parallel to the ground, an acoustic source accordingly is attributed to one of the sensors 116 when a line from that acoustic source extending to the longitudinal segment of the pipeline 204 monitored by that one of the sensors 116 is perpendicular to that pipeline 204 segment. As discussed in further detail below, all acoustic sources, whether they comprise events 208 or other acoustic generators, such as environmental noise or sound emitted by a leak, attributed to one of the sensors 116 are summed into a single acoustic source for that one of the sensors 116.
3. The acoustic sources occur in, on, or near the pipeline 204. An acoustic source is "near" a pipeline when the acoustics emitted by the source are measurable by at least one of the sensors 116.
4. Acoustic sources are mutually uncorrelated.
5. Acoustic waves travel along an acoustic path that extends through various media including the fluid in the pipeline 204, the pipeline 204 wall, and material surrounding the pipeline 204.
6. Acoustic waves are reflected by valves, imperfections, etc. in the pipeline 204, and interfaces in the material surrounding the pipeline 204.
7. Leaks are not always present, but when they occur they resemble a broadband stochastic process.

A measured acoustic signal is a measurement of an acoustic signal resulting from a superposition of signals from multiple acoustic sources (each a "source signal") that reach the sensor 116 via multiple paths; those acoustic sources may represent acoustic events 208, other sources, or both. Thus when an acoustic event 208 occurs along the pipeline 204, the processor 104 detects the event 208 using several of the nearest sensors 116 as the source signal generated by the event 208 propagates through the ground, pipeline 204 wall, and fluid inside the pipeline 204. Consequently, even though an event 208 is only attributed to one of the sensors 116, many of the sensors 116 are able to measure the event 208. Two features that distinguish a measured acoustic signal from the source signals that cause it are:
1. a single source signal generated by a single acoustic source near the pipeline 204 is present in many of the measured acoustic signals measured along different sensors 116; and
2. a measured acoustic signal may separately comprise a source signal and its reflection, which is treated as another source signal. A source signal per se excludes its reflections.

As source signals travel through a medium to reach one or more of the sensors 112 (possibly along many different paths), they are affected by the medium through which they are travelling. Thus the measured acoustic signal is a sum of filtered versions of one or more source signals emanating from one or more acoustic sources. For any given one of the sensors 116, the transfer function describing the filtering of the source signal generated by the acoustic source as it propagates to that one of the sensors 116 is called the "path response" and in embodiments in which the pipeline 204 is being monitored for leaks comprises the acoustic response of the longitudinal segment of the pipeline 204 corresponding to that one of the sensors 116.

Acoustics Propagation Model

Figure 3:
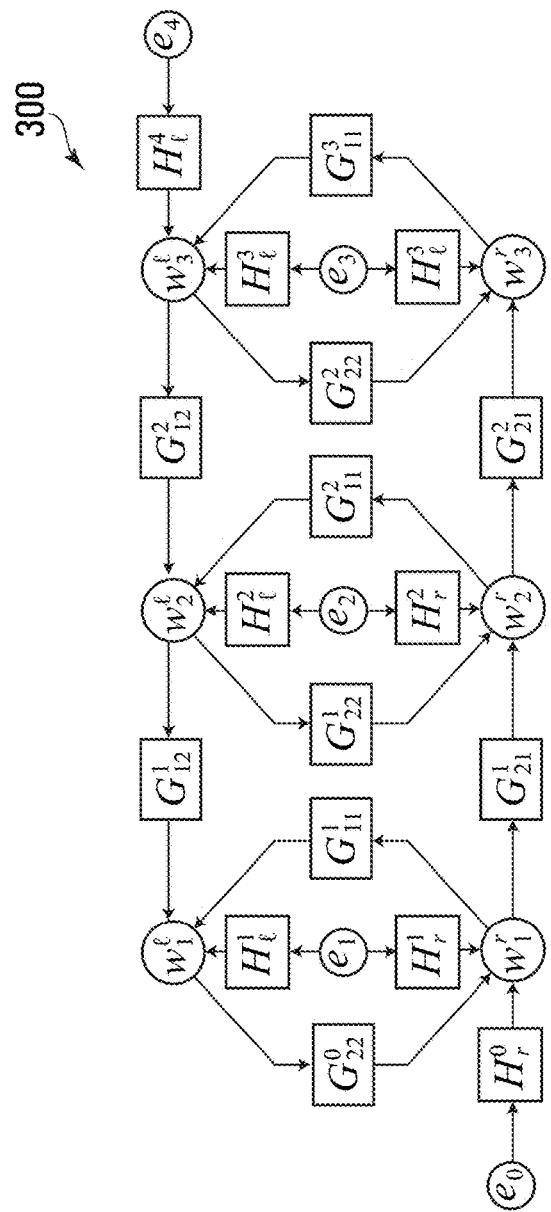
FIGS. 3 and 4 depict block diagrams of a model for acoustic propagation along a pipeline, according to additional example embodiments.

FIG. 3 depicts a block diagram of a model 300 for acoustic wave propagation along the pipeline 204 in which the pipeline 204 is deemed to be extending in the left and right directions for convenience. The model 300 is not "identifiable" in that given proper data, estimates of all the desired transfer functions used in the model 300 cannot be determined. In FIG. 3 the model's 300 nodes and blocks are defined as follows:

1. $w_i^l$ denotes an acoustic wave at sensor 116 i propagating to the left;
2. $w_i^r$ denotes an acoustic wave at sensor 116 i propagating to the right;
3. $G_{12}^i$ denotes the path response of an acoustic wave propagating to the left from sensor 116 i+1 to i;
4. $G_{21}^i$ denotes the path response of an acoustic wave propagating to the right from sensor 116 i to i+1;
5. $G_{11}^i$ denotes the path response of an acoustic wave that was traveling to the right at sensor 116 i, and was reflected (i.e. is now traveling to the left) before it reached sensor 116 i+1;
6. $G_{22}^i$ denotes the path response of an acoustic wave that was traveling to the left at sensor i+1 and was reflected before it reached sensor 116 i;
7. $e_i$ denotes an acoustic source that is attributed to in sensor 116 i. Sources are represented as white stochastic processes (white noise) and are hereinafter interchangeably referred to as "external signals" $e_i$;
8. $H_r^i$ denotes the frequency content of the source signal originating from source $e_i$ traveling to the right. It is assumed that the source signal generated by source i predominantly follows the path of the other acoustic waves traveling to the right; and
9. $H_l^i$ denotes the frequency content of the source signal originating from source $e_i$ traveling to the left. It is assumed that the source signal generated by source i predominantly follows the path of the other acoustic waves traveling to the left. In FIG. 3, the acoustic path response for one of the sensors 116 i is characterized by $G_{12}^i$, $G_{21}^i$, $G_{11}^i$ and $G_{22}^i$.

An acoustic measurement at sensor 116 i at time t is modeled as:

$$w_i(t)=F_i(q)(w_i^r(t)+w_i^l(t))+s_i(t) \quad (1)$$

where $F_i$ is the acoustic sensor frequency response, and $s_i$ is sensor noise (i.e. measurement error). The sensor 116 measures acoustic waves traveling in both directions. Unless otherwise stated herein, $s_i$ is assumed to be very small compared to $e_i$ and accordingly can for practical purposes be dropped from the equations. A component of the sensor frequency response is an integration over the sensor's 116 length.

The transfer functions $G_{12}^i$, $G_{21}^i$, $G_{11}^i$, and $G_{22}^i$ describe the acoustic path response; that is, the acoustic response of the path the acoustic wave travels, which in the depicted embodiment comprises the pipeline 204. Thus these transfer functions are affected by physical changes in the pipeline 204 due to dents, corrosion, fluid density, fluid flow rate, fluid pressure within the pipeline 204, material surrounding the pipeline 204, and the like. On the other hand, the transfer functions $H_r^i$ and $H_l^i$ describe the filter that shapes the source signals affecting the pipeline 204 as generated by the external sources $e_i$. As discussed above, those acoustic waves are by definition white noise, and so the filter $H_r^i$ changes according to the frequency content of the external sources $e_i$ affecting the pipeline 204 such as wind, machinery, traffic noise, river noise, etc.

Given the measurements $w_i$, i=1, 2, . . . the transfer functions $G_{12}^i$, $G_{21}^i$, $G_{11}^i$, $G_{22}^i$, $H_r^i$, and $H_l^i$ o=1, 2, . . . in the model 300 shown in FIG. 3 are not identifiable primarily due to the fact that the measured acoustic signal is a superposition of acoustic waves (filtered source signals) travelling in all directions.

The mathematical relationship between the measured variables $w_i$, i=1, 2, . . . is determined below. A mathematical representation of the equations illustrated in FIG. 3 for a six sensor setup is:

$$\begin{bmatrix} w_1^l \\ w_1^r \\ w_2^l \\ w_2^r \\ w_3^l \\ w_3^r \\ w_4^l \\ w_4^r \\ w_5^l \\ w_5^r \\ w_6^l \\ w_6^r \end{bmatrix} = \begin{bmatrix} & G_{11}^1 & G_{12}^1 & & & & & & & & & \\ G_{22}^0 & & & & & & & & & & & \\ & & & & G_{11}^2 & G_{12}^2 & & & & & & \\ & G_{21}^1 & G_{22}^1 & & & & & & & & & \\ & & & & & & G_{11}^3 & G_{12}^3 & & & & \\ & & & G_{21}^2 & G_{22}^2 & & & & & & & \\ & & & & & & & & G_{11}^4 & G_{12}^4 & & \\ & & & & & G_{21}^3 & G_{22}^3 & & & & & \\ & & & & & & & & & & G_{11}^5 & G_{12}^5 \\ & & & & & & & G_{21}^4 & G_{22}^4 & & & \\ & & & & & & & & & & & G_{11}^6 \\ & & & & & & & & & G_{21}^5 & G_{22}^5 & \end{bmatrix} \begin{bmatrix} w_1^l \\ w_1^r \\ w_2^l \\ w_2^r \\ w_3^l \\ w_3^r \\ w_4^l \\ w_4^r \\ w_5^l \\ w_5^r \\ w_6^l \\ w_6^r \end{bmatrix} + \begin{bmatrix} H_l^1 & \\ H_r^0 & H_r^1 \\ H_l^2 & \\ H_r^2 & \\ H_l^3 & \\ H_r^3 & \\ H_l^4 & \\ H_r^4 & \\ H_l^5 & \\ H_r^5 & \\ H_l^6 & H_l^7 \\ H_r^6 & \end{bmatrix} \begin{bmatrix} e_0 \\ e_1 \\ e_2 \\ e_3 \\ e_4 \\ e_5 \\ e_6 \\ e_7 \end{bmatrix} \quad (2)$$

Equation (2) can be expressed as:

$$w^m(t)=G^m(q)w^m(t)+H^m(q)e^m(t) \quad (3)$$

An equation in terms of $w_i$'s as defined in Equation (1) is desirable. The expression for $w^m$ in terms of only $e^m$ is $$w^m=(I-G^m)^{-1}H^m e^m \quad (4)$$

where the inverse is guaranteed to exist because $I-G^m$ is monic. In order to obtain an expression with a vector of $F_i(q)(w_i^r+w_i^l)$, i=1, 2, . . . , on the left hand side, premultiply Equation (4) by $$M = \begin{bmatrix} F_1 & F_1 & & & & \\ & & F_2 & F_2 & & & \\ & & & & F_3 & F_3 & & \\ & & & & & & F_4 & F_4 & \\ & & & & & & & & F_5 & F_5 \\ & & & & & & & & & & F_6 & F_6 \end{bmatrix}$$

resulting in $$w(t)=M(q)(I-G^m(q))^{-1}H^m(q)e(t)=W(q)e(t) \quad (5)$$

where the elements of w are $w_i$ as defined in Equation (1) and $w(q)=M(q)(I-G^m(q))^{-1}H^m(q)$. Two points about Equation (5) are:

1. The matrix W is a full matrix (i.e. all entries are non-zero). In particular, each entry is a product of $H_r^i$, $H_l^i$, and $G_{nm}^i$, m,n=1, 2, and i=1, 2, 3, . . . .
2. Due to the structure of the network shown in FIG. 3, W can be factored into two matrices of transfer functions, where one of the matrices of transfer functions depends only on the acoustic path responses $G_{11}^i$, $G_{12}^i$, $G_{21}^i$, $G_{22}^i$, i=1, 2, . . . .

Determining the acoustic path responses the pipeline 204 segments being monitored by the sensors 116 is desired. Because each element in W is a function of $G_{11}^i$, $G_{12}^i$, $G_{21}^i$, $G_{22}^i$, $H_r^i$'s and $H_l^i$, i=1, 2, . . . it is not sufficient to monitor the transfer functions of W. In order to independently monitor the acoustic path responses from the acoustic sources $e_i$ affecting the pipeline, W is factored. W can be factored as:

$$W(q)=F(q)(I-G(q))^{-1}H(q) \quad (6)$$

where $F=\text{diag}(F_1, \ldots, F_6)$, and $$G = \begin{bmatrix} 0 & G_{12} & & & & \\ G_{21} & 0 & G_{23} & & & \\ & G_{32} & 0 & G_{34} & & \\ & & G_{43} & 0 & G_{45} & \\ & & & G_{54} & 0 & G_{56} \\ & & & & G_{65} & 0 \end{bmatrix},$$

$$H = \begin{bmatrix} H_{10} & H_1 & H_{12} & & & & \\ & H_{21} & H_2 & H_{23} & & & \\ & & H_{32} & H_3 & H_{34} & & \\ & & & H_{43} & H_4 & H_{45} & \\ & & & & H_{54} & H_5 & H_{56} \\ & & & & & H_{65} & H_6 & H_{67} \end{bmatrix},$$

where $$G_{ij} = \frac{G_{12}^i N_{i-1}}{D_{i-1,i}} \text{ if } i<j,$$

$$G_{ij} = \frac{G_{21}^j N_i}{D_{i-1,i}} \text{ if } i<j,$$

$$H_i = \frac{H_l^i(1+G_{22}^i)N_{i-1}+H_r^i(1+G_{11}^{i-1})N_i}{D_{i-1,i}},$$

$$H_{ij} = -G_{ij}H_p^i, \text{ if } i<j,$$

$$H_{ij} = -G_{ij}H_i^i, \text{ if } i<j,$$

where $$N_k = \det\begin{bmatrix} 1+G_{11}^k & G_{12}^k \\ G_{21}^k & 1+G_{22}^k \end{bmatrix},$$

$$D_{mn} = \det\begin{bmatrix} 1+G_{11}^m & G_{12}^m & & \\ & 1 & G_{11}^n & G_{12}^n \\ G_{21}^m & G_{22}^m & 1 & \\ & & G_{21}^n & 1+G_{22}^n \end{bmatrix}.$$

Using the factorization of Equation (6), a network equation relating the measured variables is:

$$w(t)=W(q)e(t)$$

$$F^{-1}(q)w(t)=G(q)F^{-1}(q)w(t)+H(q)e(t)$$

$$w(t)=F(q)G(q)F^{-1}(q)w(t)+F(q)H(q)e(t), \quad (7)$$

where G, H, and F are defined in Equation (6).

Two points about Equation (7) are:
1. G is only a function of $G_{11}^i$, $G_{12}^i$, $G_{21}^i$, $G_{22}^i$, i=1, 2, . . . .
2. H is not square.

The first point means that the dynamics of the acoustic path (represented by the acoustic path responses $G_{11}^i$, $G_{12}^i$, $G_{21}^i$, and $G_{22}^i$, i=1, 2, . . . ) can be identified independently from the external signals' $e_i$ frequency content (represented by $H_l^i$ and $H_r^i$, i=1, 2, . . . ).

The second point is an issue in that rectangular noise models may not be identifiable. In the following text a noise model that is statistically equivalent to H in Equation (7) is derived, but it is square. Two statistically equivalent noise models $H_1$ and $H_2$ are such that the statistics of $v_1$ and $v_2$ are the same for both noise models (where $v_i=H_ie$, i=1, 2, where $e_i$, is a white noise process). In particular $v_1$ and $v_2$ are statistically equivalent if they have the same power spectral density $\Phi_{v_i}=H(e^{j\omega})H(e^{-j\omega})\sigma_{e_i}^2$, where $\sigma_{e_i}^2$ is the power of the white noise process $e_i(t)$.

Noise models are closely related to spectral factors. By the spectral factorization theorem, any power spectral density matrix $\Phi(z)$ can be uniquely factored as $\Phi(z)=H(z)H(z^{-1})^T$ where H(z) is a (square) monic stable, minimum phase transfer matrix. For Equation (7) the power spectral density matrix of the noise is equal to:

$$\Phi_v(z) = \quad (8)$$

$$H(z)H(z^{-1})^T = \begin{bmatrix} A_{11}(z) & B_{12}(z) & C_{13}(z) & 0 & 0 & 0 \\ B_{21}(z) & A_{22}(z) & B_{23}(z) & C_{24}(z) & 0 & 0 \\ C_{31}(z) & B_{32}(z) & A_{33}(z) & B_{34}(z) & C_{35}(z) & 0 \\ 0 & C_{42}(z) & B_{43}(z) & A_{44}(z) & B_{45}(z) & C_{46}(z) \\ 0 & 0 & C_{53}(z) & B_{54}(z) & A_{55}(z) & B_{56}(z) \\ 0 & 0 & 0 & C_{64}(z) & B_{65}(z) & A_{66}(z) \end{bmatrix}$$

where $$A_{ii}(z)=H_{i,i-1}(z)H_{i,i-1}(z^{-1})+H_{ii}(z)H_{ii}(z^{-1})+H_{i,i+1}(z)H_{i,i+1}(z^{-1})$$

$$B_{ij}(z)=H_{ij}(z)H_{jj}(z^{-1})+H_{ii}(z)H_{ji}(z^{-1})$$

$$C_{ij}(z)=H_{i,i-1}(z)H_{j,j-1}(z^{-1}).$$

Note that the power spectral density in Equation (8) is 5-diagonal para-Hermitian matrix. Para-Hermitian means that the (i, j) th entry, $\Phi_{ij}(z)=\Phi_{ji}(z^{-1})$. Moreover, no entries in the diagonal bands are zero, as long as there is no situation where $C_{ij}$ or $B_{ij}$ are equal to zero. From Equations (7) and (8):

$$C_{ij} = H_{i,i-1}(z)H_{j,j-1}(z^{-1})$$
$$= \frac{G_{12}^{i-1}(z)N_{i-1}(z)H_r^{i-1}(z)G_{21}^{i-1}(z^{-1})N_j(z^{-1})H_l^{j+1}(z^{-1})}{D_{i-1,i-1}(z)D_{j-1,j-1}(z^{-1})}.$$

It follows that elements $C_{ij}$ only equal zero if either $G_{12}^{i-1}$ or $G_{21}^{i-1}$ are zero, which means there is no acoustic energy transfer between the sensors 116. This, in practice, is unlikely. The same argument can be made for the elements $B_{ij}$. A 5-diagonal matrix where none of the elements in the diagonal bands are zero is hereinafter referred to as a full 5-diagonal matrix. The following lemma shows that the spectral factor of a full 5-diagonal matrix is nearly a full 3-diagonal matrix.

Lemma 1: Let $\Phi_v$ be an n×n Hermitian matrix. Let H be the unique, monic, stable and minimum phase spectral factor of $\Phi_v$. If $\Phi$ is a full 5-diagonal matrix then H is a full 3-diagonal matrix with possibly non-zero entries in the (3,1) and (n−2, n) positions and possibly zero entries in the (2,1) and (n−1, n) positions.

From Equation (8) and Lemma 1 it follows that v=He can be equivalently modelled as v=H̃ẽ where H̃ is a square, monic, stable, minimum phase full 3-diagonal matrix. Thus, H can be replaced by H̃ in Equation (7) without any changes to w. Consequently, the final model for the acoustic sensor setup is:

$$w(t)=F(q)G(q)F^{-1}(q)w(t)+F(q)\tilde{H}(q)\tilde{e}(t). \quad (9)$$

Figure 4:
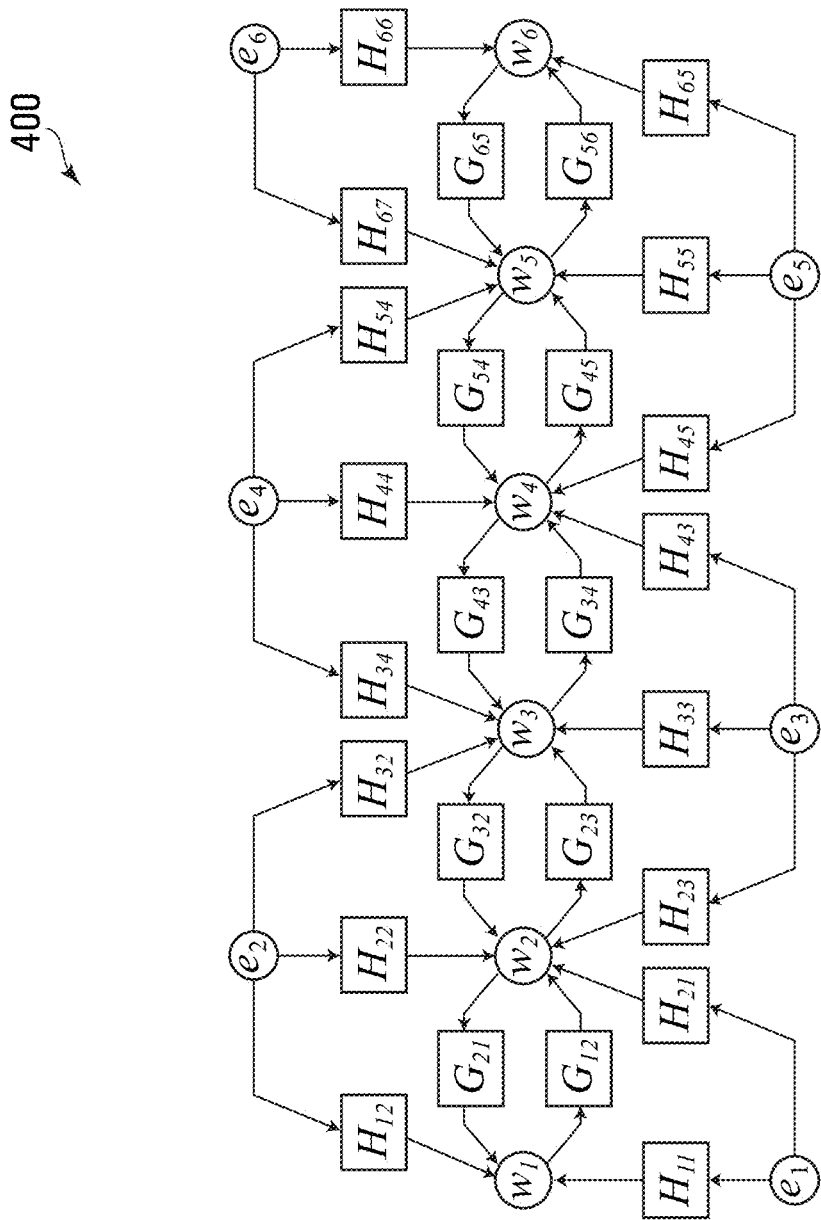

A graphical representation of Equation (9) is shown as a model 400 in FIG. 4. The model 400 depicts measured variables $w_i$, i=1, . . . , 6, and external sources $e_i$, i=1, . . . ,6. The relationship between measurements $w_i$, i=1, 2, . . . and sources $ẽ_i$, i=1, 2, . . . can be determined from Equation (9) as $$w(t) = (I - F(q)G(q)F^{-1}(q))^{-1}F(q)\tilde{H}(q)\tilde{e}(t) \quad (10)$$
$$= F(q)(I - G(q))^{-1}\tilde{H}(q)\tilde{e}(t) \quad (11)$$

Let $\check{W}(q)=F(q)(I-G(q))^{-1}\tilde{H}(q)$.

Certain points about Equation (9) are summarized in the following list:
1. The transfer functions $G_{ij}$, i, j=1, 2, . . . are functions of only the acoustic path responses, i.e. only $G_{11}^i$, $G_{12}^i$, $G_{21}^i$, and $G_{22}^i$, i=1, 2, . . . as defined in Equation (2). Thus a change in the acoustic path response is reflected by a change in one or more $G_{ij}$, i, j=1, 2, . . . . In contrast, a change in the loudness or frequency content of the acoustic sources (external signals $e_i$) does not change any $G_{ij}$, i, j=1, 2, . . . .
2. A change in the frequency content of the external signals $e_i$ affecting the pipeline 204 results in a change in the acoustic source transfer functions $H_{ij}$, i, j=1, 2, . . . .
3. Recall that F is a diagonal matrix of the sensor response functions. If each sensor has approximately the same response then $F(q)G(q)F^{-1}(q)$ is approximately independent of the sensor response. The dominant feature of the sensor response is due to the fact that each of the sensors 116 is distributed.

Using the first two points it is possible to distinguish between changes in the acoustic path response and changes in the frequency content of the external signals $e_i$ affecting the pipeline 204.

Implementation

The methods and techniques described above may be implemented using, for example, Matlab™ software. The method to obtain estimates of $F(q)G(q)F^{-1}(q)$ and $F(q)\tilde{H}(q)$ in Equation (9) is split into three actions. In the first action the processor 102 estimates the matrix $\check{W}$ in Equation (10) from the data. In the second action the processor 102 factors the estimated $\check{W}$ into $F(q)G(q)F^{-1}(q)$ and $F(q)\tilde{H}(q)$ as defined in Equation (9). In the last action the processor 102 further refines the estimates of $F(q)G(q)F^{-1}(q)$ and $F(q)\tilde{H}(q)$ to reduce prediction error.

The method for the first action, i.e. estimating $\check{W}$ in Equation (9) from data, is a by-product of estimating the source powers using, for example, a technique such as that presented in chapter 6 of Huang, Y., Benesty, J., and Chen, J. (2006), Acoustic MIMO Signal Processing, Signals and Communication Technology, Springer-Verlag Berlin Heidelberg and in chapter 7 of Liung, L. (1999), System Identification, Theory for the User, $2^{nd}$ Edition, Prentice Hall, the entireties of both of which are hereby incorporated by reference. In this action, the processor 102 determines an estimate of $\check{W}$, where each element of $\check{W}(q, \theta)$ is a parameterized transfer function that is parameterized using a Finite Impulse Response (FIR) structure, i.e. the elements are parameterized as:

$$W_{ij}(q,\theta)=\theta_{ij}^{(1)}q^{-d_{ij}}+\theta_{ij}^{(2)}q^{-d_{ij}-1}+\ldots+\theta_{ij}^{(m)}q^{-d_{ij}-m}, i,j=1,2,\ldots i\neq j,\ W_{ii}(q,\theta)=1+\theta_{ii}^{(1)}q^{-1}+\ldots+\theta_{ii}^{(m)}q^{-m}, i=1,2,\ldots,$$

where $d_{ij}$ is the delay of the (i,j)th off-diagonal transfer function representing the time it takes for an acoustic wave to travel between the sensors 116 and $\theta_{ij}$ is a parameter to be estimated.

When performing the second action, the processor 102 factors the estimate $\check{W}(q, \hat{\theta})$ into G and H, where $\hat{\theta}$ is an estimated version of $\theta$, which the processor 102 may determine in one example embodiment according to Equation (21) as discussed in further detail below. The processor 102 in one example embodiment does this factorization using a linear regression. It is desirable to factor $\check{W}$ as:

$$\check{W}(q,\theta)=B^{-1}(q,\beta)A(q,\alpha), \quad (12)$$

where $\alpha$ and $\beta$ are parameter vectors that define A and B. From Equation (9), $A(q, \alpha)$ is an estimate of $F(q)\tilde{H}(q)$, and $B(q, \beta)$ is an estimate of $F(q)(I-G(q))^{-1}F^{-1}(q)$. In addition, from Equation (9) the matrices $F(q)\tilde{H}(q)$ and $F(q)(I-G(q))^{-1}F^{-1}(q)$ have a particular structure. Therefore, A and B are parameterized with the same matrix structure:

$$A(q,\alpha) = \begin{bmatrix} 1 & A_{12}(q,\alpha) & & & \\ A_{21}(q,\alpha) & 1 & A_{23}(q,\alpha) & & \\ & A_{32}(q,\alpha) & \ddots & \ddots & \\ & & \ddots & 1 & A_{L-1,L}(q,\alpha) \\ & & & A_{L,L-1}(q,\alpha) & 1 \end{bmatrix},$$

$$B(q,\beta) = \begin{bmatrix} B_{11}(q,\beta) & B_{12}(q,\beta) & & & \\ B_{21}(q,\beta) & B_{22}(q,\beta) & B_{23}(q,\beta) & & \\ & B_{32}(q,\beta) & \ddots & \ddots & \\ & & \ddots & B_{L-1,L-1}(q,\beta) & B_{L-1,L}(q,\beta) \\ & & & B_{L,L-1}(q,\beta) & B_{LL}(q,\beta) \end{bmatrix},$$

where each $A_{ij}(q, \alpha)$, and $B_{ij}(q, \beta)$ are parameterized transfer functions. Each $A_{ij}(q, \alpha)$, and $B_{ij}(q, \beta)$ are parameterized using a FIR structure, although in different embodiments (not depicted) a different parameterization may be used. This choice ensures uniqueness of the estimates and also makes the estimation of $\alpha$ and $\beta$ easier. In particular the processor 102 parameterizes $A_{ij}(q, \alpha)$, and $B_{ij}(q, \beta)$ as $$A_{ij}(q,\alpha) = \alpha_{ij}^{(1)} q^{-d_{ij}} + \alpha_{ij}^{(2)} q^{-d_{ij}-1} + \ldots + \alpha_{ij}^{(m)} q^{-d_{ij}-m}, i,$$
$$j = 1, 2, \ldots,$$

$$B_{ij}(q,\beta) = \beta_{ij}^{(1)} q^{-d_{ij}} + \beta_{ij}^{(2)} q^{-d_{ij}-1} + \ldots + \beta_{ij}^{(m)} q^{-d_{ij}-m}, i,$$
$$j = 1, 2, \ldots, i \neq j,$$

$$B_{ii}(q,\beta) = 1 + \beta_{ij}^{(1)} q^{-1} + \ldots + \beta_{ii}^{(m)} q^{-m}, i = 1, 2, \ldots.$$

The parameterization is entirely defined by $\alpha$, $\beta$, $d_{ij}$, $i, j = 1, 2, \ldots$, and $m$.

From Equation (12) it follows that $$B(q,\beta)W(q,\hat{\theta}) = A(q,\alpha). \tag{13}$$

Because W, A, and B are parameterized using an FIR structure, $\alpha$ and $\beta$ appear linearly in Equation (13). This means that the equations can be re-organized to gather all elements of $\alpha$ and $\beta$ into a vector:

$$[P \quad M(\hat{\theta})] \begin{bmatrix} \alpha \\ \beta \end{bmatrix} = \zeta(\hat{\theta}),$$

where $\zeta(\hat{\theta})$ is a vector. Due to the structure of A and B because W and B are parameterized with monic transfer functions on the diagonal, it follows that $[P \ M(\hat{\theta})]$ is square and always full rank. Therefore, estimates of $\alpha$ and $\beta$ can be obtained as:

$$\begin{bmatrix} \hat{\alpha} \\ \hat{\beta} \end{bmatrix} = [P \quad M(\hat{\theta})]^{-1} \zeta(\hat{\theta}). \tag{14}$$

In certain embodiments the processor 102 uses any one or more of several methods to further refine $\hat{\alpha}$ and $\hat{\beta}$ such that they better represent the data. For example, the processor 102 may use a Weighted Null Space Least Squares (WNLS) method. The processor 102 may use WNLS to iteratively minimize the prediction error by iteratively adjusting the value of $\hat{\theta}$.

For example, in certain example embodiments the processor 102 iteratively selects values of $\hat{\theta}$ until the prediction error converges such that a stopping criterion is satisfied. In embodiments in which the processor selects $\hat{\theta}$ using Equation (21), for example, the processor 102 may iteratively select $\hat{\theta}$ until the difference between successive iterations is small enough to satisfy the stopping criterion. In one specific example, the processor 102 ceases iterating when successive iterations of the slope of the objective function being minimized is small enough (e.g., a difference of less than $1 \times 10^{-4}$) to satisfy the stopping criterion.

The processor 102 also determines when an estimated acoustic path response and/or an acoustic source transfer function has changed. In order to continuously monitor the pipeline 204, the processor 102 segments the data coming collected using the fiber 112 into blocks of a certain duration, each of which in the depicted embodiment is one minute long. For each block of data, the processor 102 determines estimates of $F(q)G(q)F^{-1}(q)$ and $F(q)\breve{H}(q)$.

The result is that the processor 102 determines a sequence of estimated transfer functions in the form of the acoustic path responses and the acoustic source transfer functions. The processor 102 then monitors the estimated transfer functions for changes. Depending on which transfer function changes, the change may represent a change in the acoustic path (e.g., a hole in the pipeline 204) or a change in the frequency content of the external sources $e_i$ (e.g., a truck driving in the vicinity of the pipeline 204). Because the processor 102 compares two estimated transfer functions, in certain embodiments the processor 102 determines the confidence bounds for each transfer function. The processor 102 then uses the confidence bounds to determine the statistical distance between the two estimated frequency response functions at a particular frequency. The processor 102 does this as follows.

Let $G(e^{j\omega}, \hat{\theta})$ and $\breve{H}(e^{j\omega}, \hat{\theta})$ denote the frequency response functions of the estimates of G and $\breve{H}$. The covariance of the frequency response functions of the estimated transfer functions is $$\text{Cov}\begin{bmatrix} G(e^{j\omega}, \hat{\theta}) \\ \breve{H}(e^{j\omega}, \hat{\theta}) \end{bmatrix} \approx \frac{1}{N} T(e^{j\omega}, \theta_0) P_\theta T(e^{-j\omega}, \theta_0),$$

where $$T(e^{j\omega}, \theta) = \begin{bmatrix} \frac{d}{d\theta} G(e^{j\omega}, \theta) & \frac{d}{d\theta} \breve{H}(e^{j\omega}, \theta) \end{bmatrix},$$

and $P_\theta$ is the covariance matrix of the estimated parameter vector:

$$P_\theta = (\mathbb{E}\left[\psi(t, \theta_0) \Lambda_0^{-1} \psi^T(t, \theta_0)\right])^{-1},$$

where $$\psi(t, \theta) = -\frac{d}{d\theta}\varepsilon(t, \theta),$$

where $\varepsilon$ is the prediction error.

Let the variance of $G(e^{j\omega}, \hat{\theta})$ and $H(e^{j\omega}, \hat{\theta})$ be denoted $\sigma_G^2(e^{j\omega})$ and $\sigma_H^2(e^{j\omega})$ respectively. Then the statistical difference between two estimates $G(e^{j\omega}, \hat{\theta}_1)$ and $G(e^{j\omega}, \hat{\theta}_2)$ is:

$$d(e^{j\omega}) = \sqrt{2} \frac{G(e^{j\omega}, \hat{\theta}_1) - G(e^{j\omega}, \hat{\theta}_2)}{\sqrt{\sigma_G^2(e^{j\omega}, \hat{\theta}_1) - \sigma_G^2(e^{j\omega}, \hat{\theta}_2)}} \tag{15}$$

The processor 102 determines the statistical distance at each frequency of the frequency response functions. From Equation (15) it follows that if the estimates $G(e^{j\omega}, \hat{\theta}_1)$ and $G(e^{j\omega}, \hat{\theta}_2)$ are very different at frequencies where the variance of the estimates are small, then the statistical distance between them is large. In contrast, if the estimates $G(e^{j\omega}, \hat{\theta}_1)$ and $G(e^{j\omega}, \hat{\theta}_2)$ are very different at frequencies where the variance of the estimates is large, then the statistical distance between the estimates is not as big as before. Thus, by using statistical difference to monitor for changes in transfer functions, the processor 102 incorporates uncertainty associated with the estimates into the monitoring method.

Accordingly, in one embodiment consistent with the above description, the method for detecting whether the acoustic event has occurred comprises, given periodically refreshed data sets of length N obtained from L channels of the sensor as shown in FIG. 2:
1. Choose parameterization for the matrices W (q, θ), A(q, α) and B(q, β).
2. For each new data set that is received, the processor 102:
   (a) Estimates $\breve{W}$ in Equation (9) by estimating source powers.
   (b) Using $\breve{W}(\hat{\theta})$, determines estimates of $F(q)G(q)F^{-1}(q)$ and $F(q)\breve{H}(q)$, as outlined in Equations (12) to (14).
   (c) Refines the estimates of $F(q)G(q)F^{-1}(q)$ and $F(q)\breve{H}(q)$ using WNLS.
   (d) Determines the variance of the frequency response functions of the estimated transfer functions.
3. Determine the statistical distance to the previous estimates using Equation (15).

Figure 10:
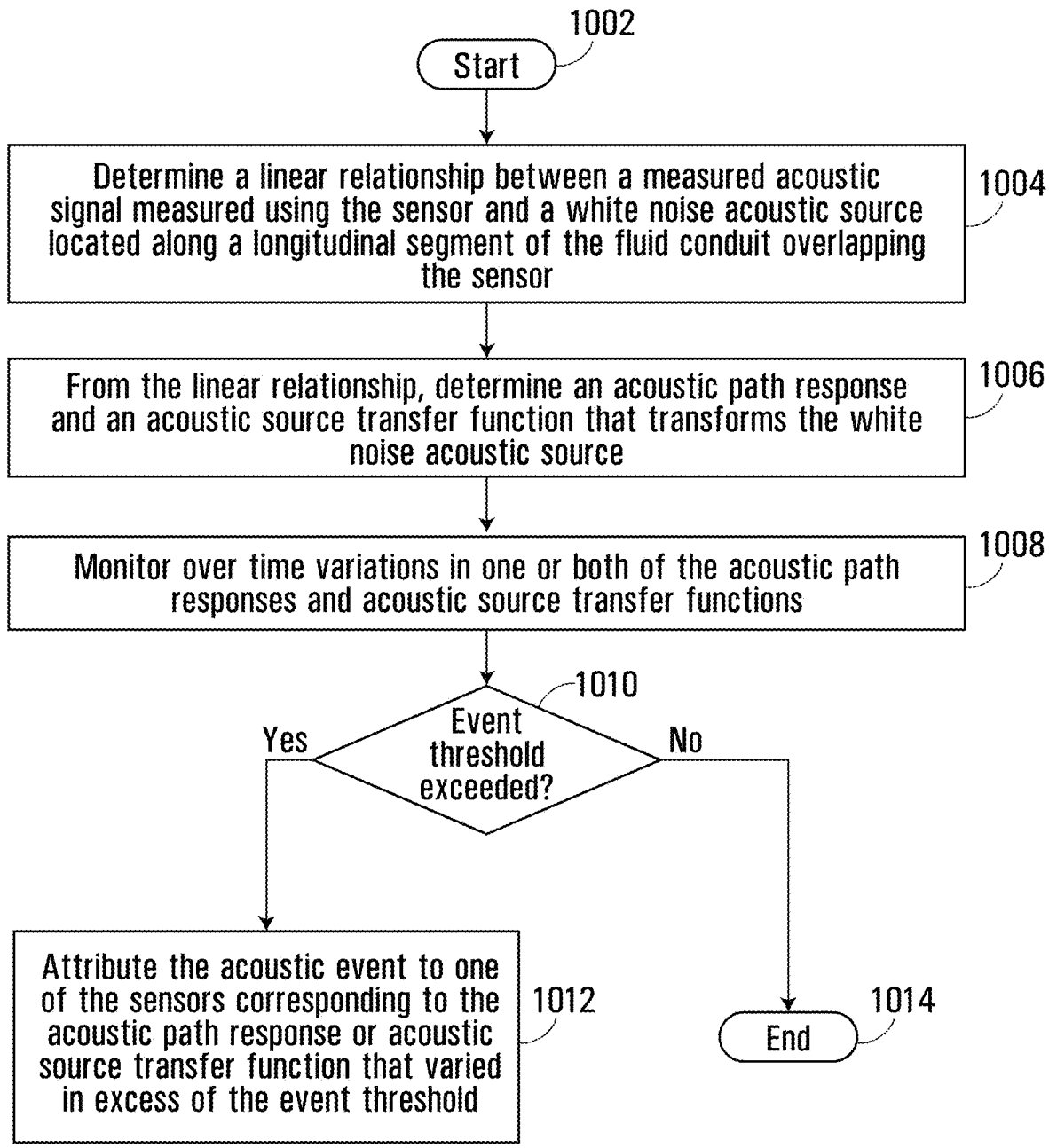
FIG. 10 depicts a method for determining whether an event has occurred along a fluid conduit, according to another embodiment.

One example embodiment of this method is depicted in FIG. 10, which may be expressed as computer program code and performed by the processor 102. In FIG. 10, the processor 102 begins at block 1002 and proceeds to block 1004 where it determines a linear relationship between the measured acoustic signal and the white noise acoustic source (external source $e_i$) located along a longitudinal segment of the fluid conduit overlapping the sensor. The processor 102 then proceeds to block 1006 where, from the linear relationship, it determines an acoustic path response and an acoustic source transfer function that transforms the white noise acoustic source. In one embodiment the processor 102 does this by determining $F(q)G(q)F^{-1}(q)$ and $F(q)\breve{H}(q)$ as described above. Determining $F(q)G(q)F^{-1}(q)$ and $F(q)\breve{H}(q)$ for a portion of the fiber 112 results in determining the acoustic path response and acoustic source transfer function for each of the sensors 116 comprising that portion of the fiber 112. The processor 102 performs blocks 1004 and 1006 for all of the sensors 116.

The processor 102 then proceeds to block 1008 where it monitors over time variations in one or both of the acoustic path responses and acoustic source transfer functions. An example of this is determining statistical differences of one or both of the acoustic path responses and acoustic source transfer functions as described above.

The processor 102 subsequently proceeds to block 1010 where it determines whether at least one of the variations exceeds an event threshold. An example of this is determining whether the determined statistical differences exceed the event threshold.

If not, the processor 102 proceeds to block 1014 and the method of FIG. 10 ends.

If at least one of the power estimates exceeds the event threshold, the processor 102 proceeds from block 1010 to 1012. At block 1012, the processor 102 attributes the acoustic event 208 to one of the sensors 116 for which the acoustic path response or acoustic source transfer function varied in excess of the event threshold. For example, the processor 102 may attribute the acoustic event 208 to the one of the sensors 116 for which the acoustic path response or acoustic source transfer function most exceeds the event threshold. Alternatively, in embodiments in which there are multiple acoustic events, the processor 102 may attribute one of the acoustic events 208 to each of the sensors 116 for which the acoustic path response or acoustic source transfer function exceeds the event threshold. In one example embodiment in which there is only one acoustic event 208, the event threshold is selected such that the acoustic path response or acoustic source transfer function exceeds the event threshold for only one of the sensors 116, and the acoustic event 208 is attributed to that sensor 116.

In embodiments in which there are multiple acoustic events 208, the power estimates of the acoustic sources attributed to multiple of the sensors 116 may exceed the event threshold; in the current embodiment, the processor 102 attributes a different acoustic event 208 to each of the sensors 116 i to which is attributed an acoustic source that exceeds the event threshold. The event threshold for the sensors 116 may be identical in certain embodiments; in other embodiments, the event thresholds may differ for any two or more of the sensors 116.

In embodiments in which the acoustic event 208 is the leak, the processor 102 determines the acoustic event as affecting the longitudinal segment of the pipeline 204 corresponding to the sensor 116 to which the acoustic event is attributed.

EXAMPLES

Figure 5:
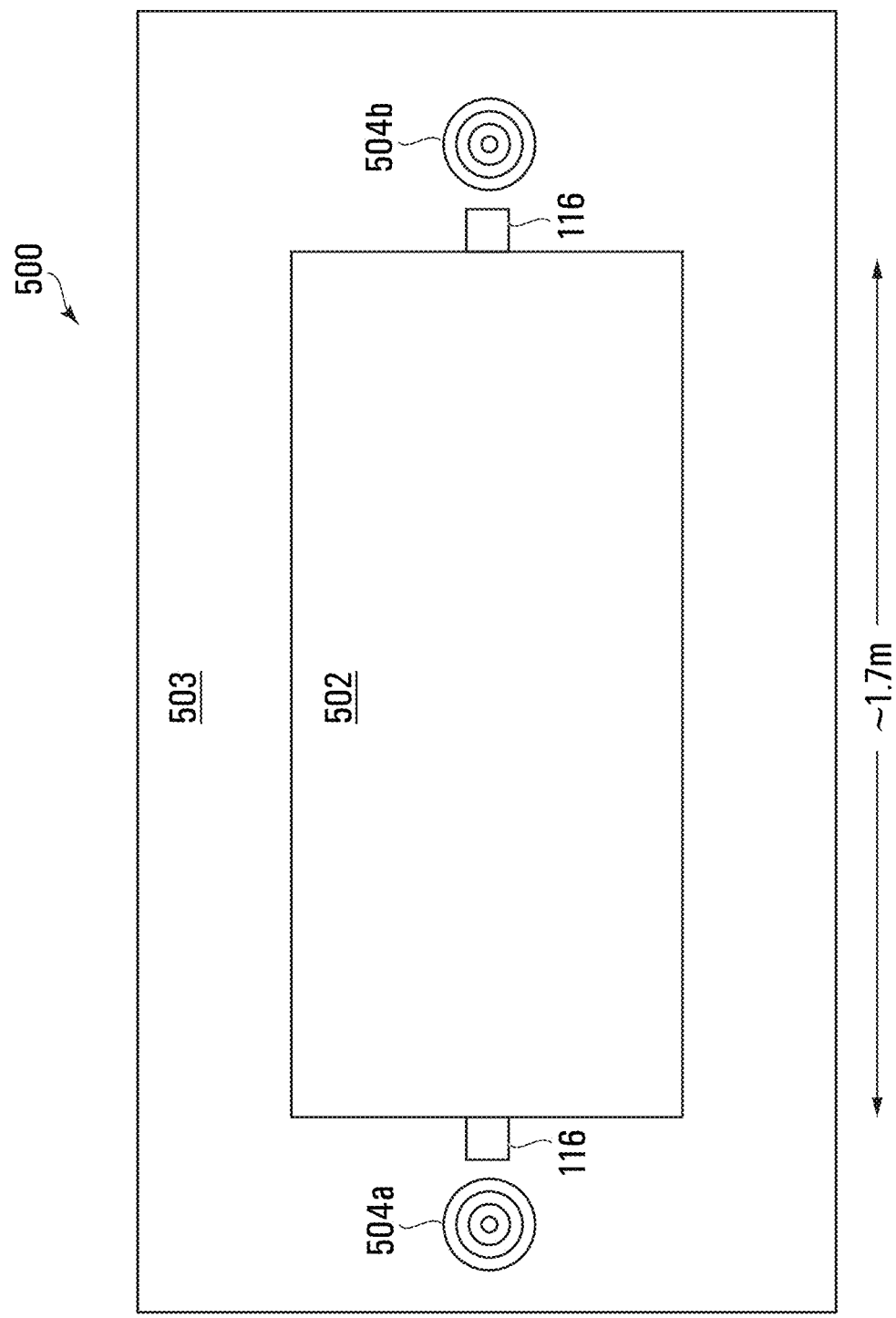
FIG. 5 depicts a test setup used to validate a method for determining whether an event has occurred along a fluid conduit, according to another embodiment.

FIG. 5 depicts test equipment used to validate the method described above, while FIGS. 6-8 depict the associated experimental results. More particularly, FIG. 5 depicts equipment 500 comprising a rectangular piece of acoustic foam 502 laid on the floor 503 of a room. Outside of the foam 502 and adjacent the centers of the foam's 502 short sides are two pieces of PVC pipe around which the optical fiber 112 and FBGs 114 are wrapped, and which consequently act as the sensors 116. A first speaker 504a and a second speaker 504b are adjacent the PVC pipe (the speakers 504a,b are collectively "speakers").

Two uncorrelated sequences of Gaussian noise were generated. Each signal was split into 4 parts. Parts 1-4 were filtered by a Chebyshev Type 1 Bandpass filter of order 2, 3, 4, and 5, respectively. The signals were played over the speakers 504a,b. The ordering of the first signal was $r_1$, $r_2$, $r_3$, $r_4$, and $r_1$, where $r_i$ denotes the signal filtered with bandpass filter i. The transition times of the signals are t=6, 30, 54, 78 mins. The ordering of the second signal is $r_3$, $r_4$, $r_1$, $r_2$, and $r_3$. In addition, the second signal is shifted such that the transition between filters occur at t=18, 42, 66, 90 mins Therefore, at all times, both speakers 504 are playing sequences with different spectral content, and at no time are both speakers 504 changing their spectral content simultaneously. The speakers 504 are the external signals $e_i$, and the frequency content of the external signals $e_i$, is the frequency content of the signals played over the speakers 504. A spectrogram of the frequency content of both speakers 504 in shown in the upper two plots of FIG. 6.

Figure 6:
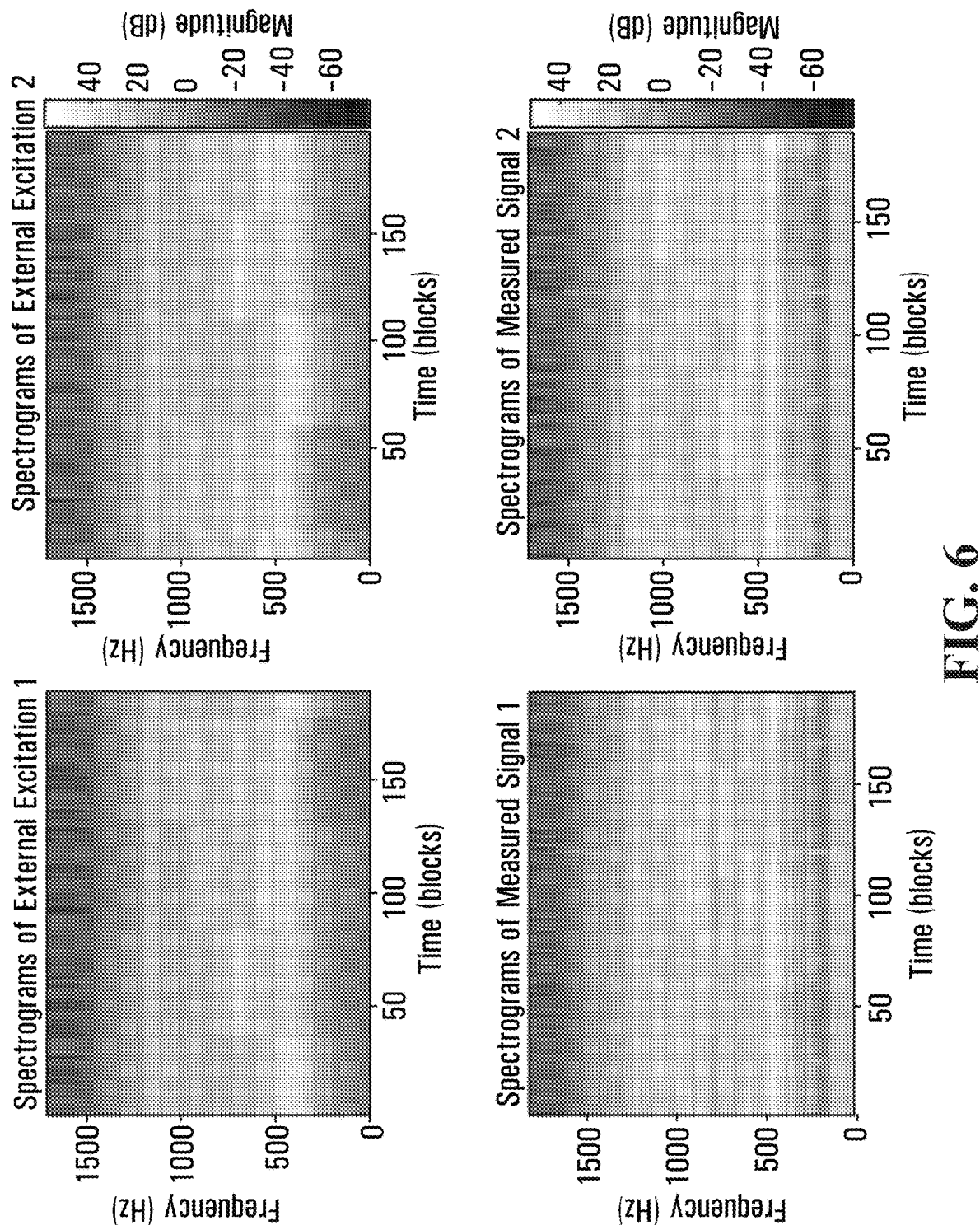
FIGS. 6-9 depict experimental results obtained using the test setup of FIG. 5.

The acoustic path in FIG. 5 is the air and the physics of the room containing the foam 502. During the experiment a foam block (not depicted) was placed in the room at time t=12 mins and then it was removed again at time t=36 mins. A plastic case (not depicted) was placed in the room in between the speakers 504 at time t=60 mins and removed at time t=85 mins. Placing objects in the room is a way to alter the acoustic path between the two sensors. Background noise was present during the collection of the data including noise from heaters, lights, outside traffic, talking in adjacent rooms, etc. The objective of the experiment was to be able to determine when the first speaker 504a changed its frequency content, when the second speaker 504b changed its frequency content, and finally when the acoustic path response changed, given only data obtained from the fiber optic sensors in the room. The bottom two plots of FIG. 6 show a spectrogram of the measured acoustic signals. As can be seen the measured signals change at many times, and it is not clear what has changed when only visually inspecting the measured signals' spectra.

Figure 7:
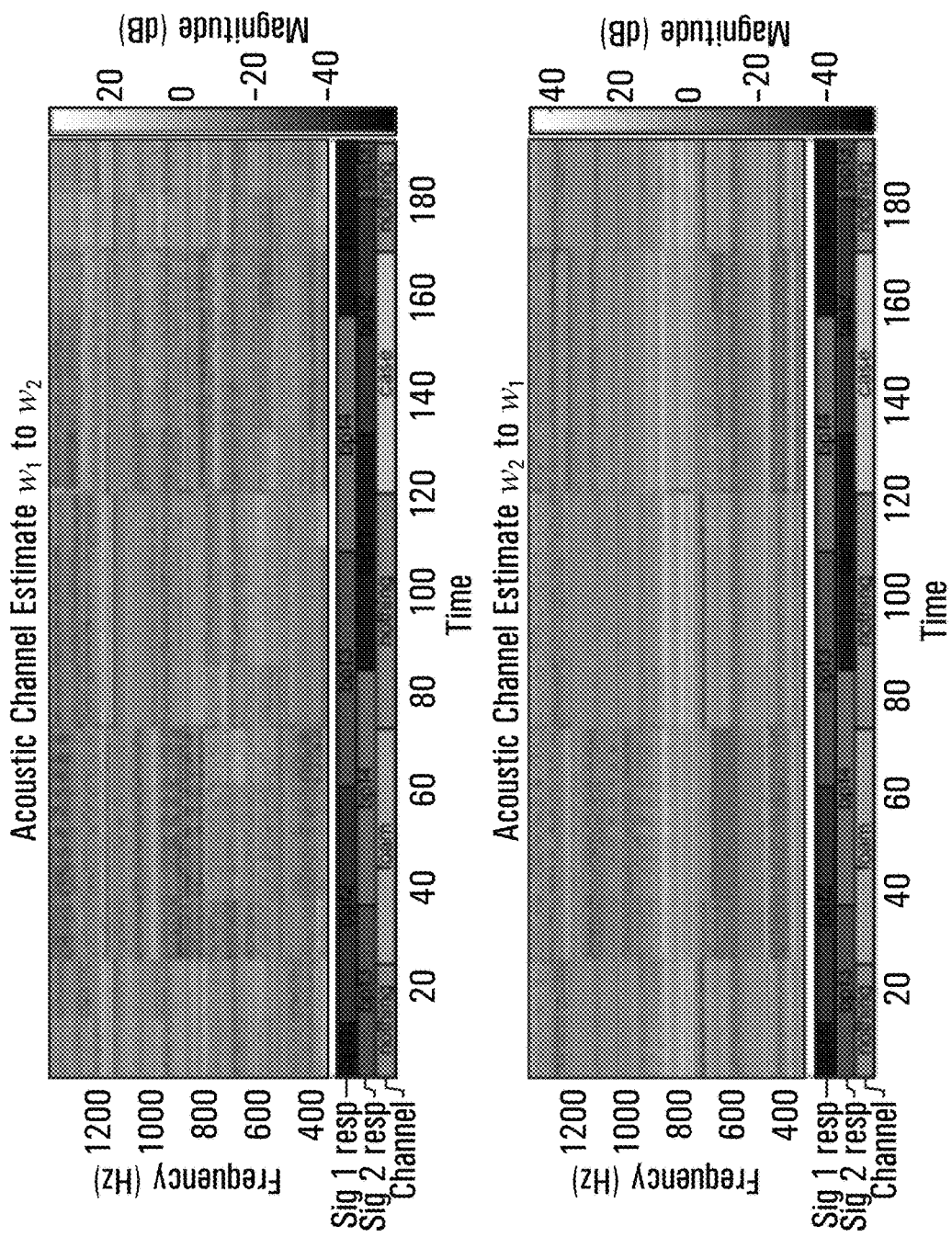

In FIG. 7 the estimated acoustic path response is shown over the duration of the experiment. The changes at times t=24, 72, 120, 170 are very noticeable. Furthermore, the estimates appear relatively constant during the time between those changes.

Figure 8:
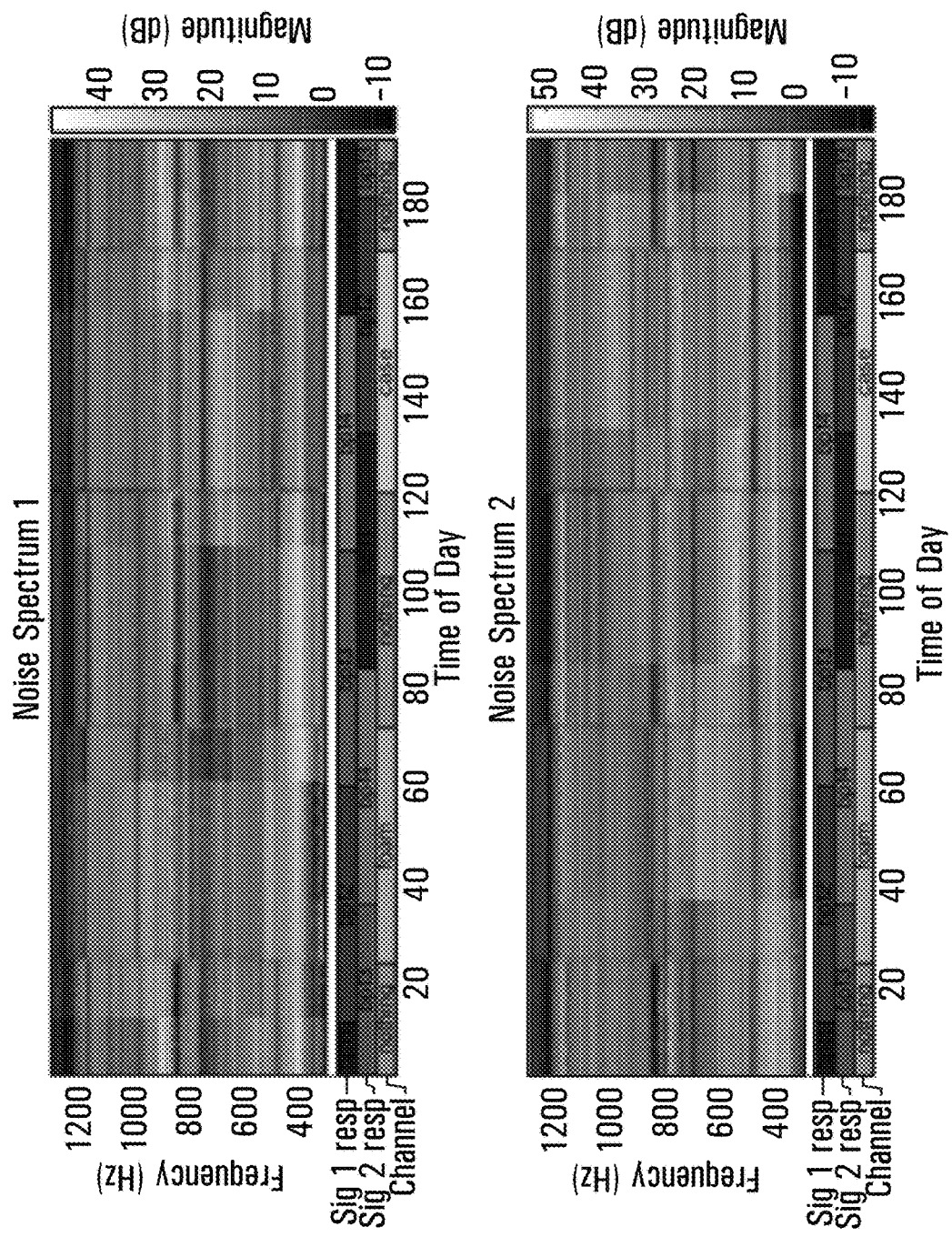

In FIG. 8 the estimated frequency content of the external signals $e_i$ is plotted. Again, the changes in the signals correspond with the changes in the source, and during the times that there are no changes, the estimates appear relatively constant. FIG. 8 shows the estimated external signal frequency content does change when the acoustic channel is changed (by placing objects in the room). This is as expected by Equation (9), which shows that the estimated transfer function matrix $F(q)\tilde{H}(q)$ is a function of the acoustic path response $G_{11}{}^i$, $G_{12}{}^i$, $G_{21}{}^i$, and $G_{22}{}^i$, i=1, 2.

Figure 9:
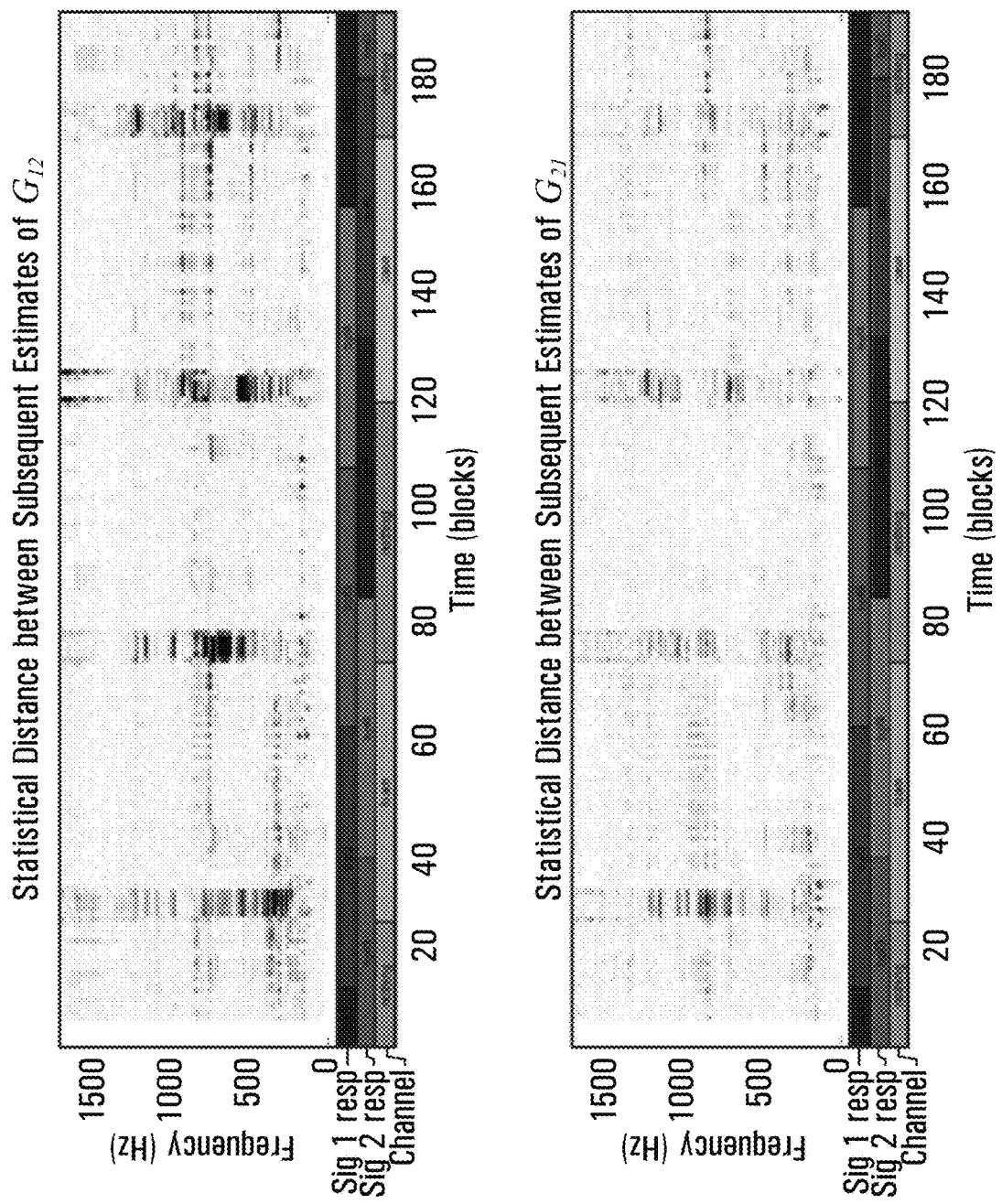

In FIG. 9 the processor 102 determines the statistical difference for the current estimate of the acoustic path response relative to the estimate 5 time blocks ago. If the acoustic path changes, and remains constant for at least 5 time blocks, the processor 102 depicts this as a dark vertical line having a width of 5 time blocks in the plot. The wide vertical lines in the plot accordingly match the times when the acoustic path was changed. In addition there do not appear to be any other vertical lines in the plot, which means that the acoustic channel was constant between the changes. By comparing FIGS. 6 and 9 it appears that the statistical difference provides a clearer indication of when the acoustic path significantly changed.

In FIG. 9 the processor 102 determines the statistical difference for the current estimate of the frequency content of the external signals to the estimate 5 time blocks ago. If the frequency content of the external signals changes, and remains constant for at least 5 time blocks, the processor 102 displays this as a dark vertical line of width 5 time blocks in the plot. This is the case when the speakers 504a,b change their frequency content. On the other hand if the frequency content of the external signals $e_i$ changes only for a short time (<1 time block), this shows up as 2 vertical lines of width 1 time block each, spaced 5 time blocks apart. This is the case when a person walked into the room to place or remove an object.

Blind Source Separation

In certain embodiments, a method known as "blind source separation" ("BSS") may be used to determine whether an acoustic event has occurred along the fluid conduit. Aspects of BSS may be used in conjunction with the transfer function embodiment described above, or as a standalone method for determining whether an acoustic event has occurred. Embodiments comprising BSS are discussed in further detail below with respect to FIGS. 11-13.

When performing BSS, the processor 102 uses the power of acoustic sources for acoustic event monitoring. The processor 102 attributes an acoustic event to a single acoustic source. The processor 102 accordingly may perform event localization by monitoring the power of the sources as opposed to monitoring the power of the measured acoustic signals.

The measured acoustic signals $w_1, \ldots, w_L$ can be assumed to be generated by the data generating system:

$$\begin{bmatrix} w_1(t) \\ \vdots \\ w_L(t) \end{bmatrix} = \begin{bmatrix} W_{11}^0(q) & \cdots & W_{1L}^0(q) \\ \vdots & \ddots & \vdots \\ W_{L1}^0(q) & \cdots & W_{LL}^0(q) \end{bmatrix} \begin{bmatrix} e_1(t) \\ \vdots \\ e_L(t) \end{bmatrix}, \quad (16)$$

where $W_{ij}^0$ are discrete time transfer functions, $q^{-1}$ is the backward shift operator (i.e. $q^{-1}u(t)=u(t-1)$), and $e_1, \ldots e_L$ are the unknown external acoustic sources that generate the data. The external sources $e_1, \ldots, e_L$ are mutually independent. Using matrix notation, Equation (16) can be expressed as:

$$w(t)=W^0(q)e(t)$$

where w and e are vectors, and $W^0$ is a transfer matrix.

The objective of BSS is to obtain an estimate of the external sources $e_1, \ldots, e_L$ that generated the measured acoutsic signals. This is achieved by finding a transfer function matrix Q that "de-correlates" the measured acoustic signals, i.e. find a matrix $Q=W^{-1}$ such that $$\begin{bmatrix} \varepsilon_1(t, \theta) \\ \vdots \\ \varepsilon_L(t, \theta) \end{bmatrix} = \begin{bmatrix} Q_{11}(q, \theta) & \cdots & Q_{1L}(q, \theta) \\ \vdots & \ddots & \vdots \\ Q_{L1}(q, \theta) & \cdots & Q_{LL}(q, \theta) \end{bmatrix} \begin{bmatrix} w_1(t) \\ \vdots \\ w_L(t) \end{bmatrix} \quad (17)$$

where $\varepsilon_1(t, \theta), \ldots, \varepsilon_L(t, \theta)$ are mutually uncorrelated for all t, and where $\theta$ is a parameter vector. In the depicted embodiment the transfer matrix Q is parameterized using a FIR model structure. However, in different embodiment, the transfer matrix Q may be differently parameterized, such as by using frequency domain and subspace model structures.

Without any further assumptions or constraints the de-correlating matrix Q and the signals $\varepsilon_1, \ldots, \varepsilon_L$ are non-unique. As an illustration of this non-uniqueness, consider the following two expressions:

$$\varepsilon(t,\theta)=Q(q,\theta)w(t) \text{ and } P\varepsilon(t,\theta)=PQ(q,\theta)w(t).$$

There is a non-uniqeness in the ordering of the estimated acoustic sources. Suppose P is a permutation matrix. In this case, if $\varepsilon$ is a vector of mutually uncorrelated sources, then so is $P\varepsilon(t)$. Secondly, there is also a non-uniqueness of the power of the estimated acoustic sources due to scaling. Suppose that P is a real valued diagonal matrix. In this case, again, if $\varepsilon(t)$ are mutually uncorrelated, then so are $P\varepsilon(t)$.

A variety of methods may be used to handle these two types of non-uniqueness. For example, some form of normalization may be enforced. In certain embodiments. It is possible to normalize according to magnitude, temporal timing, and/or continuity of pitch, for instance. The normalization is used to determine which components of the measured acoustic signals belong to which acoustic sources. For example, when normalizing based on magnitude, if the measured acoustic signal is measured loudest using sensor 116 i, then it likely belongs to the acoustic source attributed to that sensor 116 i. As another example, when normalizing based on timing, if the measured acoustic signal is heard first using sensor 116 i, then it likely belongs to the acoustic source attributed to that sensor 116 source i. Normalization is discussed in further detail below.

Besides a model structure, a normalization constraint, an objective function is also be chosen in order to select one model from the set of all possible models. Example objective functions comprise Maximum Likelihood, Least Mean Squared Errors ("LMSE"), and/or involve using higher order statistics.

When applying BSS, a parameterization, normalization, and an objective function that enable the processor 102 to consistently estimate the powers of the acoustic sources given a set of measurements obtained from the system 200 is selected.

In the embodiments below, BSS is cast in a prediction error system identification framework. The prediction-error framework estimates transfer functions and signal powers from given data sets. By formulating BSS in the prediction-error framework the processor 102 is able to determine the best normalization and parameterization of $Q(q, \theta)$ in Equation (17). In addition, the framework provides facilitates consistent estimates, provided that certain, checkable conditions are met. Finally, by using the prediction error identification framework, the processor 102 is able to determine confidence bounds on all obtained estimates. In certain embodiments the processor 102 uses these confidence bounds to determine how trustworthy the results of the BSS method are. The confidence bounds may be useful when the processor 102 is monitoring safety critical events such as leaks in an environment where there is a large amount of acoustic noise, and possible sensor faults/errors.

The prediction-error framework of system identification is described below, and show how the problem of how to apply BSS can be cast as a prediction-error minimization problem.

The prediction-error method is based on the one-step-ahead predictor. The role of the predictor is to estimate the current value of $w(t)$ given past values $w(t-1), w(t-2), \ldots, w(t-N)$, which represent past acoustic signals. The one-step-ahead prediction of w is denoted $\hat{w}(t|t-1, \theta)$, where $\theta$ is a parameter vector used to define and optimize the predictor. The expression for the one-step-ahead predictor is:

$$\hat{w}(t-1,\theta) = (I - W^{-1}(q,\theta))w(t), \quad (18)$$

where $W(\theta)$ is an $L \times L$ matrix of parameterized transfer functions. The q operator comprises a time delay, so the right-hand side of Equation (18) accordingly is directed at past acoustic signals. $W(\theta)$ is constrained to have the following properties:
1. $W(\theta)$ is monic, i.e. $\lim_{z \to \infty} W(z, \theta) = I$,
2. $W(\theta)$ is stable (all poles inside the unit circle),
3. $W^{-1}(\theta)$ is stable (all poles of $W^{-1}(z, \theta)$ inside the unit circle).

These conditions ensure the uniqueness of $W(q, \theta)$. The constraints have physical interpretations in terms of determining whether an acoustic event 208 has occurred along the pipeline 204. Constraining $W(\theta)$ to be monic means that only the transfer functions $W_{jj}(\theta)$ on the diagonal have a direct feed through term (i.e. all off-diagonal transfer functions of $W(\theta)$ have at least one delay). Thus, acoustic source $e_j$ only directly affects measurement $w_j$, and there is delay in the path from $e_j$ to any other measurement $w_i$, $i \neq j$. From a BSS point of view this means that temporal timing is used to separate the sources: if a component of the measured acoustic signals affects $w_j$ first, it belongs to acoustic source $e_j$.

Constraining the direct feedthrough term to 1 normalizes the power of the acoustic source. Because we are only interested in relative power of the acoustic source signals this constraint does not hinder the event detection approach. Constraining $W(\theta)$ and $W^{-1}(\theta)$ to be stable also makes physical sense because for a bounded acoustic source signal, the measured acoustic signal should also be bounded, and bounded measurements imply bounded acoustic source signals.

Let $Q_{ij}(\theta)$ denote the (i, j) th element of $(I - W(q, \theta)^{-1})$. Each $Q_{ij}(\theta)$ is parameterized as:

$$Q_{ij}(q, \theta_{ij}) = \theta_{ij1} q^{-d_{ij}} + \ldots + \theta_{ijm} q^{-m-d_{ij}}, i,j=1,\ldots,L, i \neq j,$$

$$Q_{ii}(q, \theta_{ii}) = 1 + \theta_{ii1} q^{-1} + \ldots + \theta_{iim} q^{-m}, i=1,\ldots,L, \quad (19)$$

where m is the length (or order) of the FIR filter and $d_{ij}$ is the delay of the (i, j) off-diagonal transfer function (note that m and $d_{ij}$, i, j=1, ..., L, $i \neq j$ fully define the parameterization). This parameterization has properties 1 and 3 listed above. Property 2 may need to be enforced using constraints. This parameterization is selected for this example embodiment (a) due to its flexibility, and (b) because it is linear in the parameters. In other words, as long as m is chosen large enough, any sensor impulse response can be approximated well, including sensor responses that include multiple acoustic paths (reverberant environments). Additionally, the parameters can be selected, and ideally optimized, by having the processor 102 solve a linear regression.

Typically in the prediction error method, the processor 102 selects the predictor with the smallest prediction error. The prediction error is defined as $$\varepsilon(t,\theta) = w(t) - \hat{w}(t|t-1,\theta) = W^{-1}(q,\theta)w(t) \quad (20)$$

where the second equality follows directly from substitution of Equation (18). The optimal predictor is the one that results in the smallest mean squared prediction error:

$$\hat{\theta}_N = \arg\min_\theta \sum_{t=0}^{N-1} \varepsilon(t, \theta)^T \Lambda(t) \varepsilon(t, \theta), \quad (21)$$

where $\Lambda(t)$ is a weighting function. A reason for choosing the LMSE objective function is that, in conjunction with the parameterization, the resulting optimization problem to find the optimal $\theta$ is simply a linear regression. This facilitates the processor 102 continuously obtaining updated estimates of the powers of the acoustic sources given the very efficient methods for solving linear regressions.

In certain embodiments, the processor 102 directly solves Equation (21) to arrive at and subsequently use the minimum prediction error. In different embodiments, the processor 102 may indirectly solve Equation (21), such as by solving iteratively. Regardless of the particular method the processor 102 uses, in different embodiments (not depicted), the processor 102 may use a non-minimal prediction error. For example, the processor 102 may select the predictor such that the prediction error satisfies a stopping criterion, which in various embodiments may comprise the prediction error being within 1%, %, 2%, 3%, 4%, 5%, 6%, 7%, 8%, 9%, 10%, 15%, 20%, 25%, or 50% of the minimum value, for example.

The weighting function $\Lambda(t)$ can be chosen to de-emphasize certain portions of the data representing the measured acoustic signals that have significant noise. If a portion of the data is found to have high noise for time $t_1$ to $t_2$, then $\Lambda(t_1)$ to $\Lambda(t_2)$ may be selected to be relatively small. The result is that the prediction errors during time $t_1$, to $t_2$ will have a small effect on the objective function, resulting in less incentive to fit the model to this portion of data as compared to more highly weighted data segments.

It can also be shown that prefiltering the data is essentially equivalent to choosing $\Lambda(t)$ to emphasize particular frequencies.

Lastly, the weighting function can be used to balance the relative magnitude of the prediction errors. For example, if one prediction error is much larger that the rest of the prediction errors, it may be advantageuous to divide the large prediction error by some number >1 to give the remaining prediction errors increased influence in the objective function. It can be shown that the optimal relative weighting is $\text{diag}(\sigma_1^2, \ldots, \sigma_n^2)$, where $\sigma_i^2$ is the power of the acoustic source attributed to sensor 116 i (note that although this weighting is shown to be optimal, in practice the source powers $\sigma_i^2$, i=1,L are unknown, and in our case they are what is being estimated, so in the present embodiment previous estimates of the source powers are used in the weighting function to estimate the current source powers).

From the prediction-error framework, the power of the optimal prediction error is an estimate of the power of the acoustic source. Thus, the estimated acoustic source powers are $$\hat{\sigma}_{e_i}^2(\theta) = \frac{1}{N}\sum_{t=0}^{N-1} \varepsilon_i^2(t, \hat{\theta}_N), \quad i = 1, \ldots L,$$

where $\hat{\theta}_N$ is the optimal parameter vector, $\hat{\sigma}_{e_j}^2$ is the estimate of $\sigma_{e_i}^2$, and N is the number of data points representing the measured acoustic signal for sensor 116 i. Minimizing the power of the estimated acoustic sources implicitly minimizes signal overlap, thus the acoustic sources are uncorrelated.

Again, from the prediction-error framework, consistent estimates of the powers of the acoustic sources are obtained from Equation (21) as long as the following two conditions hold:
1. there exists a $\theta^0$ such that W (q, $\theta^0$)=$W^0$(q) (for the parameterization this does not exactly hold, but a sufficient approximation is possible for large enough m); and
2. the acoustic sources $e_1, \ldots, e_L$ are mutually independent and persistently exciting of sufficiently high order (because the sources are assumed to be stochastic processes this condition is always satisfied).

By casting the BSS problem into the prediction error framework, it is possible to quantify how good the estimated parameters are. Two example embodiments are discussed below; each of the example embodiments uses the prediction error.

In one embodiment, the processor 102 performs a test for independence between prediction errors and past acoustic signals. If the prediction errors are correlated to the past acoustic signals, then it means that the error could have been better predicted with another method. Thus, the cross-correlation between the prediction errors and the past acoustic signals should be small, which the processor 102 determines by determining that cross-correlation and comparing that cross-correlation of the prediction errors and past acoustic signals to a cross-correlation threshold. The processor 102 determines an estimate of that cross-correlation as follows:

$$\hat{R}_{\varepsilon u}^N(\tau) = \frac{1}{N}\varepsilon(t)u(t-\tau).$$

Because $\hat{R}_{\varepsilon u}^N(\tau)$ is a random variable with Gaussian distribution, a hypothesis test is performed to determine if $\hat{R}_{\varepsilon u}^N(\tau)$ is zero or not. For instance, the hypothesis that $\varepsilon$ is uncorrelated to u is satisfied with 95% confidence level if $$\hat{R}_{\varepsilon u}^N(\tau) \leq \sqrt{\frac{P}{N}} N_{95\%} \quad (22)$$

is satisfied for $0 \leq \tau \leq M$, where M is a user chosen number, $N_{95\%}$ is the 95% level of the Gaussian distribution, and $$P = \sum_{k=-M}^{M} \hat{R}_\varepsilon(k)\hat{R}_u(k).$$

In another embodiment, the processor 102 determines whether the prediction error is white. The processor 102 does this by determining an auto-correlation of the prediction error, comparing the auto-correlation to an auto-correlation threshold, and confirming the auto-correlation satisfies the auto-correlation threshold. If the prediction error is not white, then $\varepsilon$ could have been better predicted from past acoustic signals using a different method. Again, the processor 102 performs a hypothesis test to determine if $\varepsilon$ is indeed white. The hypothesis that $\varepsilon$ is white is satisfied with 95% confidence level if $$\hat{R}_\varepsilon^N(\tau) \leq \sqrt{\frac{\hat{\sigma}_\varepsilon^2}{N}} N_{95\%} \quad (23)$$

is satisfied for all $1 \leq \tau \leq M$.

If the predictor passes one or both these tests, then the processor 102 concludes the estimate of acoustic source powers is consistent.

EXAMPLES

Figure 13:
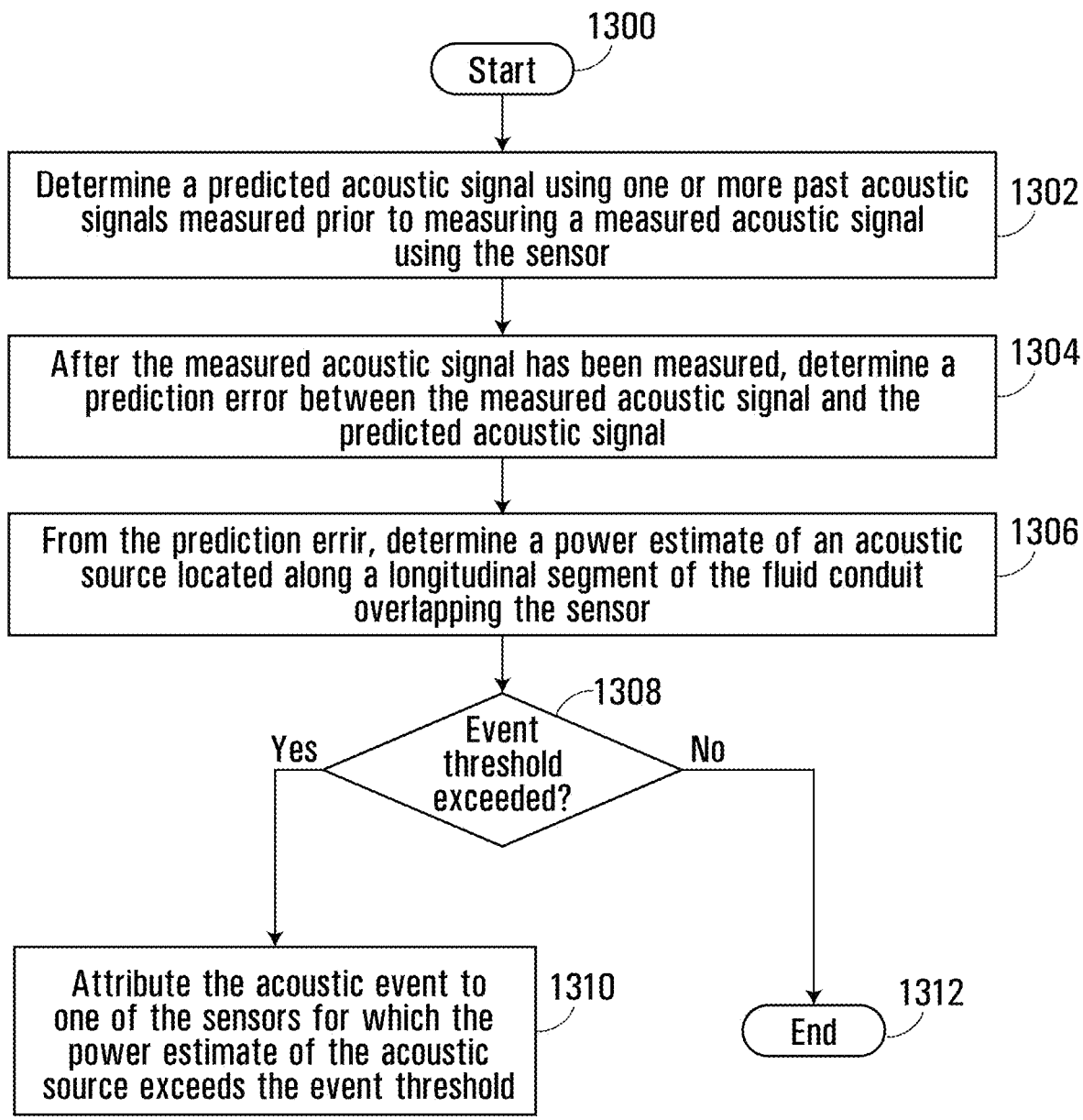
FIG. 13 depicts a method for determining whether an event has occurred along a fluid conduit, according to another embodiment.

The following describes an example method, depicted in FIG. 13, for applying BSS to the system 200 of FIG. 2 that may be implemented by the processor 102 by, for example, executing code written using Matlab™.

In this example, the processor 102 obtains a measured acoustic signal from each of the sensors 116. There are L sensors, and each of the measured acoustic signals has N samples.

The method of FIG. 13 begins at block 1300 and proceeds to block 1302 by having the processor 102 determine, for each of the sensors 116, the predicted acoustic signal using one or more past acoustic signals prior to measuring the measured acoustic signal using the sensor 116. This is done as follows:
1. Choose m, and $d_{ij}$, i, j=1, 2 in Equation (19). Choosing these parameters depends on the acoustic environment and the spacing between sensors. As an example, m in certain embodiments ranges from 300-1,000. $d_{ij}$ depends on the sampling rate. For example, in one embodiment, $d_{ij}$=floor(0.0179*$F_s$) and the sampling frequency is 41,118 Hz and downsampled by a factor of 49, resulting in $d_{ij}$ being 15.
2. For i=1 to L:
   (a) The processor 102 constructs the regression matrix:

$\phi(t)=[\phi_{i1}(t) \ldots \phi_{i1}(i)]$, where $\phi_{ij}(t)=[-w_j(t-d_{ij}) \ldots -w_j(t-m)], j=1, \ldots L, i \neq j$ $\phi_{ii}(t)=[-w_i(t-1) \ldots -w_i(t-m)]$ (b) The processor 102 finds $\theta_i$ that satisfies:

$$\hat{\theta}_i = \underset{\theta_i}{\operatorname{argmin}}(w_i(t) - \phi(t)\theta_i)^2,$$

In one embodiment, the processor 102 evaluates:

$$\hat{\theta}_i = (\phi_{ij})(t)^T \phi_{ij}(t))^{-1} \phi_{ij}^T(t) w_i(t).$$

In another embodiment, the processor 102 determines the QR factorization of $\phi_{ij}(t)$. The processor 102 then uses Q and R to estimate θ. In particular, the processor 102 determines matrices Q and R such that QR=$\phi_{ij}(t)$ and Q is an orthonormal matrix, and R is upper triangular. Then the processor 102 may determine θ as:

$$\hat{\theta}_i R^{-1} Q^T w_i.$$

After the measured acoustic signal has been measured, the processor 102 at block 1304 determines a prediction error between the measured acoustic signal and the predicted acoustic signal. The processor determines the prediction error $\varepsilon_i(t, \hat{\theta}_1)$ by determining:

$$\varepsilon_i(t, \hat{\theta}_i) = w_i(t) - \phi_{ij}(t) \hat{\theta}_i.$$

In certain embodiments (not depicted in FIG. 13), the processor 102 also determines $R_{\varepsilon_i}(\tau)$ and $R_{\varepsilon_i, w_j}(\tau)$ by evaluating Equations (22) and/or (23) to determine whether the cross-correlation between the prediction error and past acoustic signals satisfies the cross-correlation threshold, and to determine whether the prediction error is white, respectively.

If no, the processor 102 flags the data for further investigation.

If yes, the processor 102 proceeds to determine the power estimate $\hat{\sigma}_{e_i}^2$ of the acoustic source for the sensor 116 i at block 1306. The processor 102 does this by determining:

$$\hat{\sigma}_{e_i}^2 = \sum_{t=0}^{N-1} \varepsilon_i^2(t, \hat{\theta}_i)$$

The processor 102 then determines whether the power estimate of the acoustic source exceeds an event threshold for the sensor 116 i at block 1308. The processor 102 performs blocks 1302, 1304, 1306, and 1308 for all of the sensors 116.

If none of the power estimates exceeds the event threshold, the processor 102 proceeds from block 1308 to block 1312 and the method ends.

If at least one of the power estimates exceeds the event threshold, the processor 102 proceeds from block 1308 to 1310. At block 1310, the processor 102 attributes the acoustic event 208 to one of the sensors 116 for which the power estimate of the acoustic source exceeds the event threshold. For example, the processor 102 may attribute the acoustic event 208 to the one of the sensors 116 for which the power estimate of the acoustic source most exceeds the event threshold. Alternatively, in embodiments in which there are multiple acoustic events, the processor 102 may attribute one of the acoustic events 102 to each of the sensors 116 for which the power estimate of the acoustic source exceeds the event threshold. In one example embodiment in which there is only one acoustic event 208, the event threshold is selected such that only one of the power estimates exceeds the event threshold, and the acoustic event 208 is attributed to the sensor 116 used to measure the measured acoustic signal that resulted in that power estimate.

In embodiments in which there are multiple acoustic events 208, the power estimates of the acoustic sources attributed to multiple of the sensors 116 i may exceed the event threshold; in the current embodiment, the processor 102 attributes a different acoustic event 208 to each of the sensors 116 i to which is attributed an acoustic source that exceeds the event threshold. The event threshold for the sensors 116 may be identical in certain embodiments; in other embodiments, the event thresholds may differ for any two or more of the sensors 116.

Additionally, in some embodiments the power estimate of the acoustic source exceeds an event threshold when the power estimate exceeds a certain, absolute threshold. In different embodiments, the power estimate exceeds the event threshold when a variation in the estimate relative to a baseline measurement exceeds the event threshold. For example, in one embodiment the baseline measurement is the previous power estimate the processor 102 determined for that sensor 116, and if the difference between the two exceeds the event threshold then the event threshold is satisfied. As another example, in another embodiment the baseline measurement is an average of previous power estimates the processor 102 has determined; this average may, for example, be a moving average of a previous number of the power estimates. Different sensors 116 may use the same or different types of event thresholds.

Figure 11:
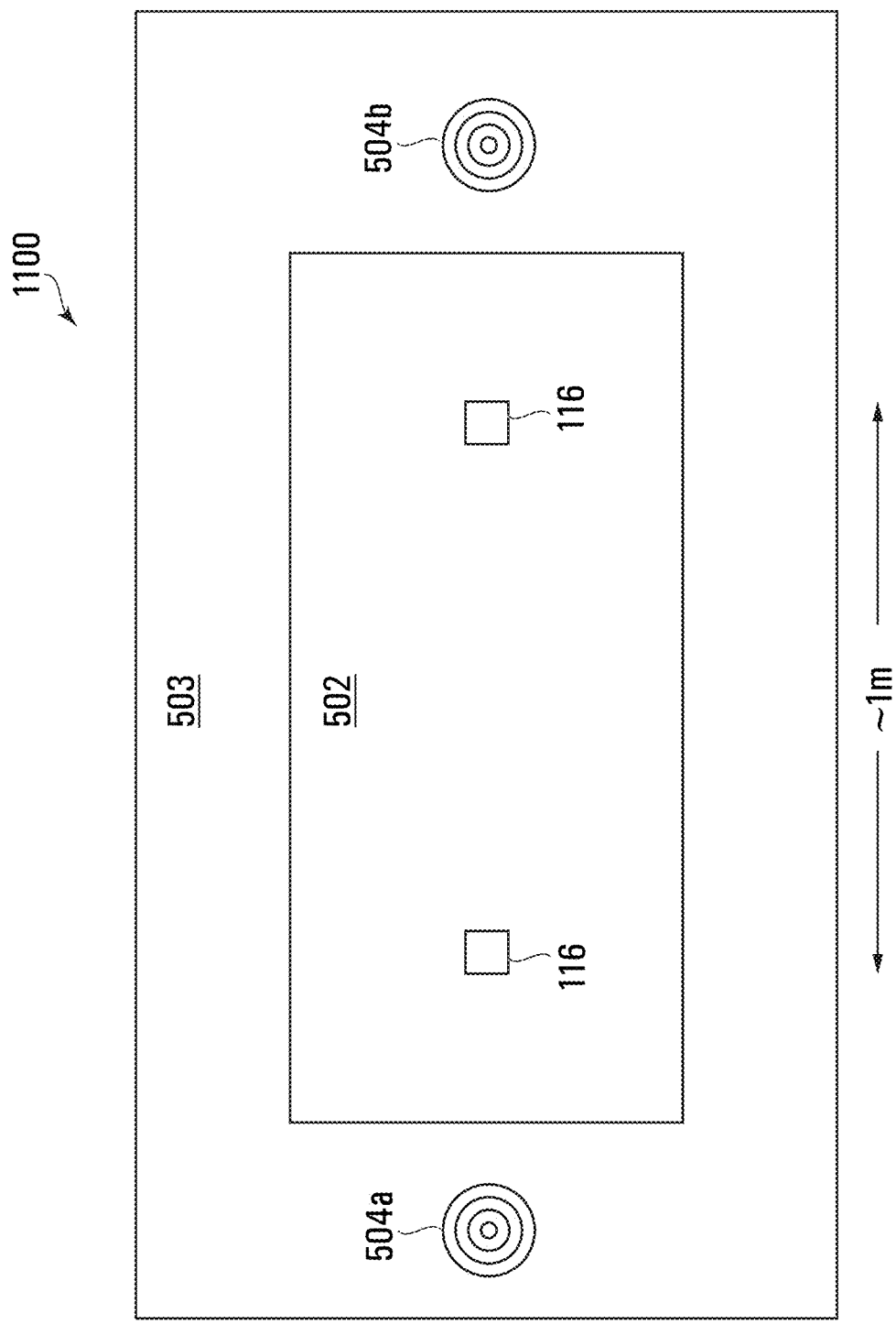
FIG. 11 depicts a test setup used to validate a method for determining whether an event has occurred along a fluid conduit, according to another embodiment.

FIG. 11 depicts test equipment used to validate the method described above, while FIG. 12 depicts the associated experimental results. More particularly, FIG. 11 depicts equipment 1100 comprising a rectangular piece of acoustic foam 502 laid on the floor 503 of a room. On the foam 502 and adjacent the centers of the foam's 502 short sides, roughly 1 m apart, are two pieces of PVC pipe around which the optical fiber 112 and FBGs 114 are wrapped and which consequently act as the sensors 116. A microphone (not shown) is also placed on each piece of pipe. A first speaker 504a and a second speaker 504b are laid directly on the floor adjacent the centers of the foam's 502 short sides.

Two uncorrelated random phase multisine signals were constructed with 2,750 sinusoids of random phase and frequencies between 197.4 Hz and 1,283 Hz. Each signal was played through one of the speakers 504a,b using the equipment 1100 of FIG. 11. The power of the signals was varied as shown in the top plot of FIG. 12. The time axis in the plot is in terms of data blocks. Each block is 1,041,500 samples, equivalent to 25.3 s. In the first portion of the signals (data blocks 1 to 70), source 1 is increasing in steps, and source 2 is decreasing in steps, and at any point in time only one source is changing in power. For the last portion if the signals (data blocks 70 to 90), source 2 greatly increases, and source 1 simultaneously slightly decreases. Ambient noise was also present.

Figure 12:
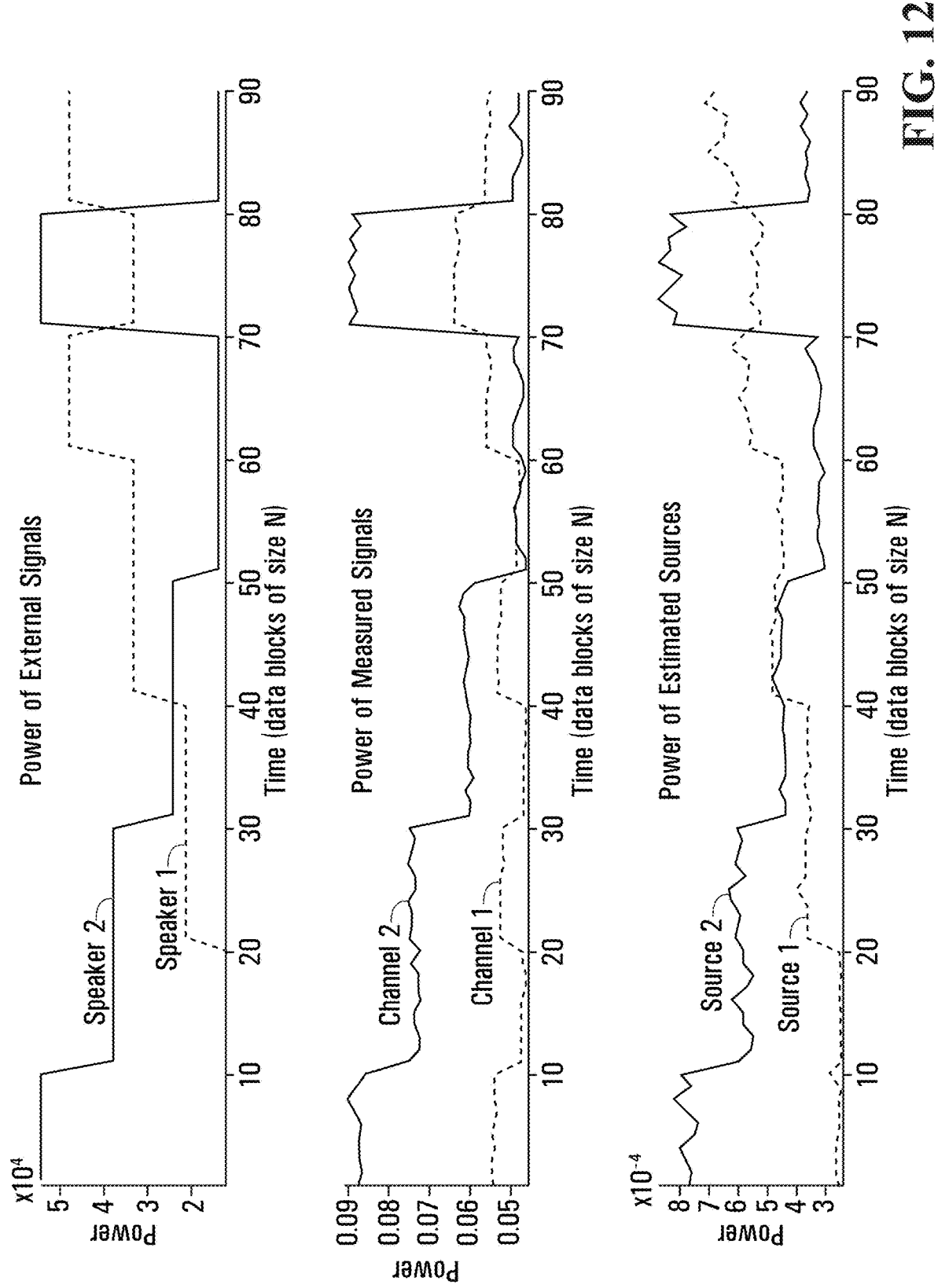
FIG. 12 depict experimental results obtained using the test setup of FIG. 11.

In the top plot of FIG. 12, the powers of the filtered white noise signals played over the speakers 504a,b during data collection are shown. The power is relative because the speakers 504a,b are not calibrated. In the middle plot of FIG. 12, the power of the measured acoustic signals is shown. Again, the power is not calibrated. In the bottom plot of FIG. 12 the power estimates of the acoustic sources are shown.

From the power of the measured acoustic signals alone, it is difficult to determine which acoustic source caused the increase/decrease in measured power. By applying the method of FIG. 13, the processor 102 determines the power estimates of the acoustic sources, which better corresponds with the powers of the signals played over the speakers 504a,b.

The embodiments have been described above with reference to flowcharts and block diagrams of methods, apparatuses, systems, and computer program products. In this regard, the flowchart and block diagram in FIGS. 1A, 3, 4, 10, and 13 illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some different embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the blocks of the flowcharts and block diagrams.

These computer program instructions may also be stored in a computer readable medium that can direct a computer, other programmable data processing apparatus, or other devices to function in a particular manner, such that the instructions stored in the computer readable medium produce an article of manufacture including instructions that implement the function or act specified in the blocks of the flowcharts and block diagrams. The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions or acts specified in the blocks of the flowcharts and block diagrams.

As will be appreciated by one skilled in the art, embodiments of the technology described herein may be embodied as a system, method, or computer program product. Accordingly, these embodiments may take the form of an entirely hardware embodiment, an entirely software embodiment (including firmware, resident software, micro-code, etc.) or an embodiment combining software and hardware that may all generally be referred to herein as a "circuit," "module," or "system." Furthermore, embodiments of the presently described technology may take the form of a computer program product embodied in one or more non-transitory computer readable media having stored or encoded thereon computer readable program code.

Where aspects of the technology described herein are implemented as a computer program product, any combination of one or more computer readable media may be utilized. A computer readable medium may comprise a computer readable signal medium or a non-transitory computer readable medium used for storage. A non-transitory computer readable medium may comprise, for example, an electronic, magnetic, optical, electromagnetic, infrared, or semiconductor system, apparatus, or device, or any suitable combination thereof. Additional examples of non-transitory computer readable media comprise a portable computer diskette, a hard disk, RAM, ROM, an erasable programmable read-only memory (EPROM or flash memory), a portable compact disc read-only memory (CD-ROM), an optical storage device, a magnetic storage device, or any suitable combination thereof. As used herein, a non-transitory computer readable medium may comprise any tangible medium that can contain, store, or have encoded thereon a program for use by or in connection with an instruction execution system, apparatus, or device. Thus, computer readable program code for implementing aspects of the embodiments described herein may be contained, stored, or encoded on the computer readable medium 104 of the signal processing device 118.

Program code embodied on a computer readable medium may be transmitted using any appropriate medium, including but not limited to wireless, wireline, optical fiber cable, radiofrequency, and the like, or any suitable combination thereof. Computer program code for carrying out operations comprising part of the embodiments described herein may be written in any combination of one or more programming languages, including an object oriented programming language and procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

One or more example embodiments have been described by way of illustration only. This description is been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. In construing the claims, it is to be understood that the use of a computer to implement the embodiments described herein is essential at least where the presence or use of computer equipment is positively recited in the claims.

The invention claimed is:

1. A method for determining whether an acoustic event has occurred along a fluid conduit having acoustic sensors positioned therealong, the method comprising using a processor to:
   (a) for each of the sensors:
      (i) determine a predicted acoustic signal using one or more past acoustic signals measured prior to measuring a measured acoustic signal using the sensor;
      (ii) after the measured acoustic signal has been measured, determine a prediction error between the measured acoustic signal and the predicted acoustic signal;
      (iii) from the prediction error, determine a power estimate of an acoustic source located along a longitudinal segment of the fluid conduit overlapping the sensor; and
      (iv) determine whether the power estimate of the acoustic source exceeds an event threshold for the sensor; and
   (b) when the power estimate of at least one of the acoustic sources exceeds the event threshold, attributing the acoustic event to one of the sensors for which the power estimate of the acoustic source exceeds the event threshold.

2. The method of claim 1 wherein the processor attributes the acoustic event to the one of the sensors for which the power estimate of the acoustic source most exceeds the event threshold.

3. The method of claim 1 wherein the acoustic event comprises one of multiple acoustic events, and wherein the processor attributes one of the acoustic events to each of the sensors for which the power estimate of the acoustic source exceeds the event threshold.

4. The method of claim 1 wherein the event threshold represents a deviation from a baseline measurement and wherein the acoustic event is attributed to the sensor having the greatest deviation from the baseline measurement.

5. The method of claim 1 wherein the processor determines the predicted acoustic signal from the one or more past acoustic signals by applying a linear regression.

6. The method of claim 5 wherein the processor applies the linear regression by multiplying a regression matrix and a parameter vector, wherein the parameter vector is parameterized using a Finite Impulse Response model structure.

7. The method of claim 6 further comprising selecting the parameter vector such that the parameter vector is sufficiently near a minimum prediction error to satisfy a stopping criterion.

8. The method of claim 7 further comprising selecting the parameter vector to minimize the prediction error.

9. The method of claim 8 wherein the processor performs a QR factorization to minimize the prediction error.

10. The method of claim 1 further comprising, for each of the sensors and prior to identifying the acoustic event as having occurred, using the processor to:
    (a) determine a cross-correlation between the prediction error and the one or more past acoustic signals;
    (b) compare the cross-correlation to a cross-correlation threshold; and
    (c) confirm the cross-correlation satisfies the cross-correlation threshold.

11. The method of claim 1 further comprising, for each of the sensors and prior to identifying the acoustic event as having occurred, using the processor to:
    (a) determine an auto-correlation of the prediction error;
    (b) compare the auto-correlation to an auto-correlation threshold; and
    (c) confirm the prediction error is white by confirming the auto-correlation satisfies the auto-correlation threshold.

12. The method of claim 1 wherein each of the sensors is delineated by a pair of fiber Bragg gratings located along an optical fiber and tuned to substantially identical center wavelengths, and further comprising optically interrogating the optical fiber in order to obtain the measured acoustic signal.

13. The method of claim 12 wherein the optical fiber is within a fiber conduit laid adjacent the fluid conduit.

14. The method of claim 1 wherein the fluid conduit comprises a pipeline.

15. A system for determining whether an acoustic event has occurred along a fluid conduit having acoustic sensors positioned therealong, the system comprising:
    (a) an optical fiber extending along the conduit and comprising fiber Bragg gratings (FBGs), wherein each of the sensors is delineated by a pair of the FBGs tuned to substantially identical center wavelengths; and
    (b) a signal processing unit comprising:
        (i) a processor communicatively coupled to the optical interrogator; and
        (ii) a non-transitory computer readable medium communicatively coupled to the processor, wherein the medium has computer program code stored thereon that is executable by the processor and that, when executed by the processor, causes the processor to perform a method comprising:
            (1) for each of the sensors:
                a) determine a predicted acoustic signal using one or more past acoustic signals measured prior to measuring a measured acoustic signal using the sensor;
                b) after the measured acoustic signal has been measured, determine a prediction error between the measured acoustic signal and the predicted acoustic signal;
                c) from the prediction error, determine a power estimate of an acoustic source located along a longitudinal segment of the fluid conduit overlapping the sensor; and
                d) determine whether the power estimate of the acoustic source exceeds an event threshold for the sensor; and
            (2) when the power estimate of at least one of the acoustic sources exceeds the event threshold, attributing the acoustic event to one of the sensors for which the power estimate of the acoustic source exceeds the event threshold.

16. The system of claim 15 further comprising a fiber conduit adjacent the fluid conduit, wherein the optical fiber extends within the fiber conduit.

17. The system of claim 15 wherein the fluid conduit comprises a pipeline.

18. A non-transitory computer readable medium having stored thereon computer program code that is executable by a processor and that, when executed by the processor, causes the processor to perform a method for determining whether an acoustic event has occurred along a fluid conduit having acoustic sensors positioned therealong, comprising:
  (a) for each of the sensors:
    (i) determine a predicted acoustic signal using one or more past acoustic signals measured prior to measuring a measured acoustic signal using the sensor;
    (ii) after the measured acoustic signal has been measured, determine a prediction error between the measured acoustic signal and the predicted acoustic signal;
    (iii) from the prediction error, determine a power estimate of an acoustic source located along a longitudinal segment of the fluid conduit overlapping the sensor; and
    (iv) determine whether the power estimate of the acoustic source exceeds an event threshold for the sensor; and
  (b) when the power estimate of at least one of the acoustic sources exceeds the event threshold, attributing the acoustic event to one of the sensors for which the power estimate of the acoustic source exceeds the event threshold.

19. The system of claim 15 wherein the event threshold represents a deviation from a baseline measurement and wherein the acoustic event is attributed to the sensor having the greatest deviation from the baseline measurement.

20. The system of claim 15 wherein the processor determines the predicted acoustic signal from the one or more past acoustic signals by applying a linear regression.

* * * * *